(12) United States Patent
Prystupa et al.

(10) Patent No.: US 11,709,138 B2
(45) Date of Patent: Jul. 25, 2023

(54) MULTI-DIMENSIONAL SPECTROSCOPY OF MACROMOLECULES

(71) Applicant: 12198681 Canada Ltd., Winnipeg (CA)

(72) Inventors: David Allan Prystupa, Pinawa (CA); John Stephen Pacak, Winnipeg (CA)

(*) Notice: Subject to any disclaimer, the term of this patent is extended or adjusted under 35 U.S.C. 154(b) by 0 days.

(21) Appl. No.: 17/387,553

(22) Filed: Jul. 28, 2021

(65) Prior Publication Data

US 2022/0034817 A1 Feb. 3, 2022

Related U.S. Application Data

(60) Provisional application No. 63/059,298, filed on Jul. 31, 2020.

(51) Int. Cl.
| | | |
|---|---|---|
| *G01J 3/44* | (2006.01) | |
| *G01N 21/68* | (2006.01) | |
| *G01N 21/65* | (2006.01) | |
| *G01N 21/63* | (2006.01) | |

(52) U.S. Cl.
CPC ............. *G01N 21/68* (2013.01); *G01N 21/65* (2013.01); *G01N 2021/638* (2013.01)

(58) Field of Classification Search
CPC .. G01N 21/68; G01N 21/65; G01N 2021/638; G01N 2201/061; G01N 21/1717; G01N 21/21; G01J 3/44; G01J 3/02
See application file for complete search history.

(56) References Cited

U.S. PATENT DOCUMENTS

| | | |
|---|---|---|
| 10,585,044 B2 | 3/2020 | Prystupa et al. |
| 10,858,268 B2 * | 12/2020 | Chew .................... C02F 1/4602 |
| 2008/0154128 A1 * | 6/2008 | Milner ................. A61B 5/0515 |
| | | 600/427 |
| 2020/0149931 A1 | 5/2020 | Prystupa et al. |
| 2020/0150036 A1 | 5/2020 | Prystupa et al. |

* cited by examiner

*Primary Examiner* — Abdullahi Nur
(74) *Attorney, Agent, or Firm* — Adrian D. Battison; Ade & Company Inc.; Ryan W. Dupuis

(57) ABSTRACT

Information relating to a target molecule in a sample volume containing sample molecules is obtained by applying a sequence of temporally varying fields in a field direction to the sample volume caused by acoustic forces and/or by electromagnetic fields where the sequence of temporally varying fields is chosen to produce a sequence of at least two different perturbed molecular configurations for said target molecule in the sample and where the perturbed molecular configurations are at least in part correlated with the direction of said applied fields. A sequence of probe radiation is applied on the sample molecules and interaction radiation is collected for measuring amplitudes of the interaction radiation collected for a plurality of directions and/or polarizations which are related to the field direction. Where reference spectra are available from previous experiments, the method can be used for identifying a target molecule in the sample volume.

36 Claims, 8 Drawing Sheets

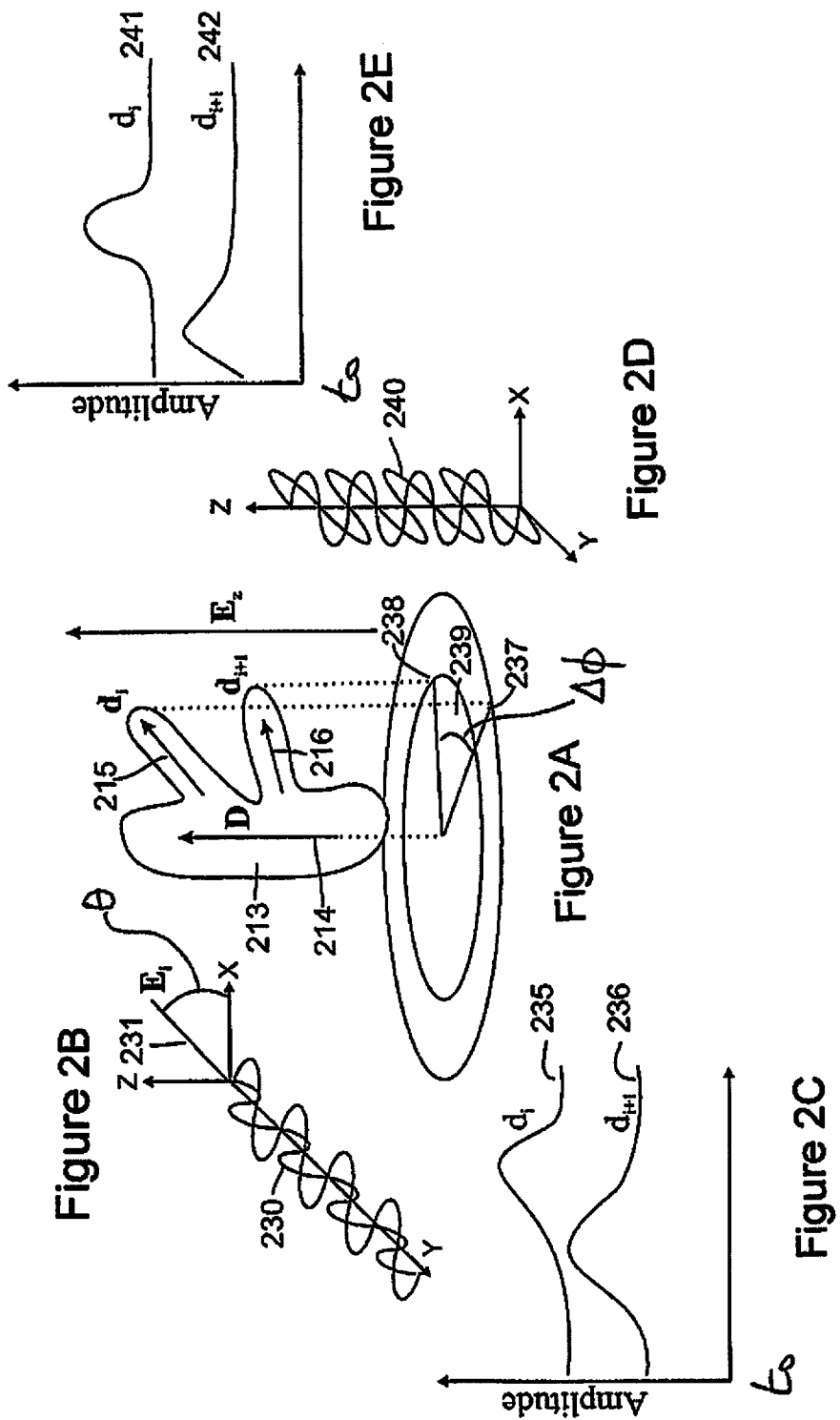

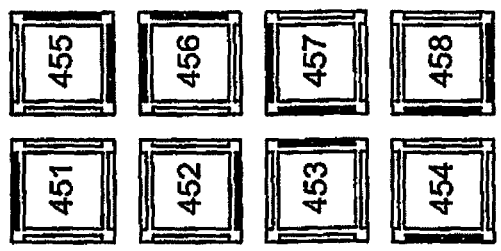
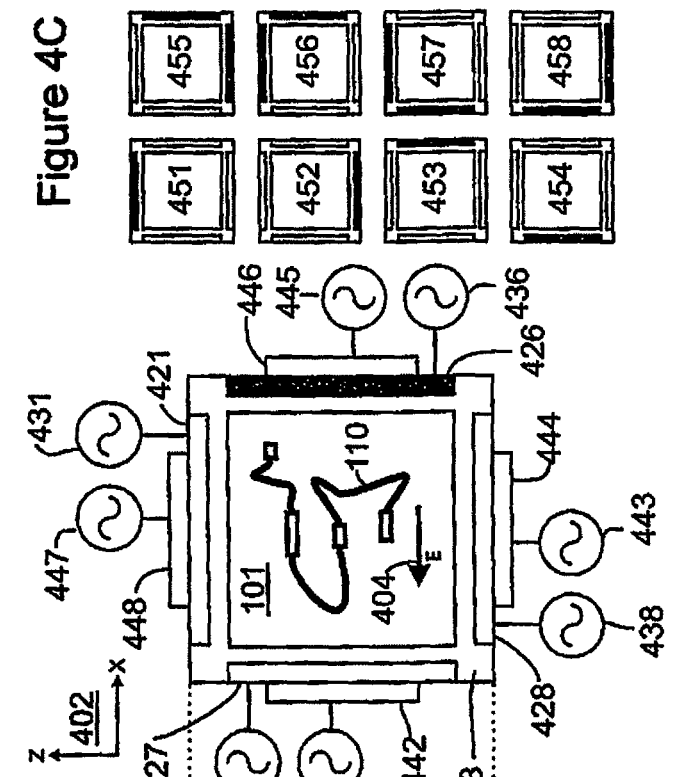
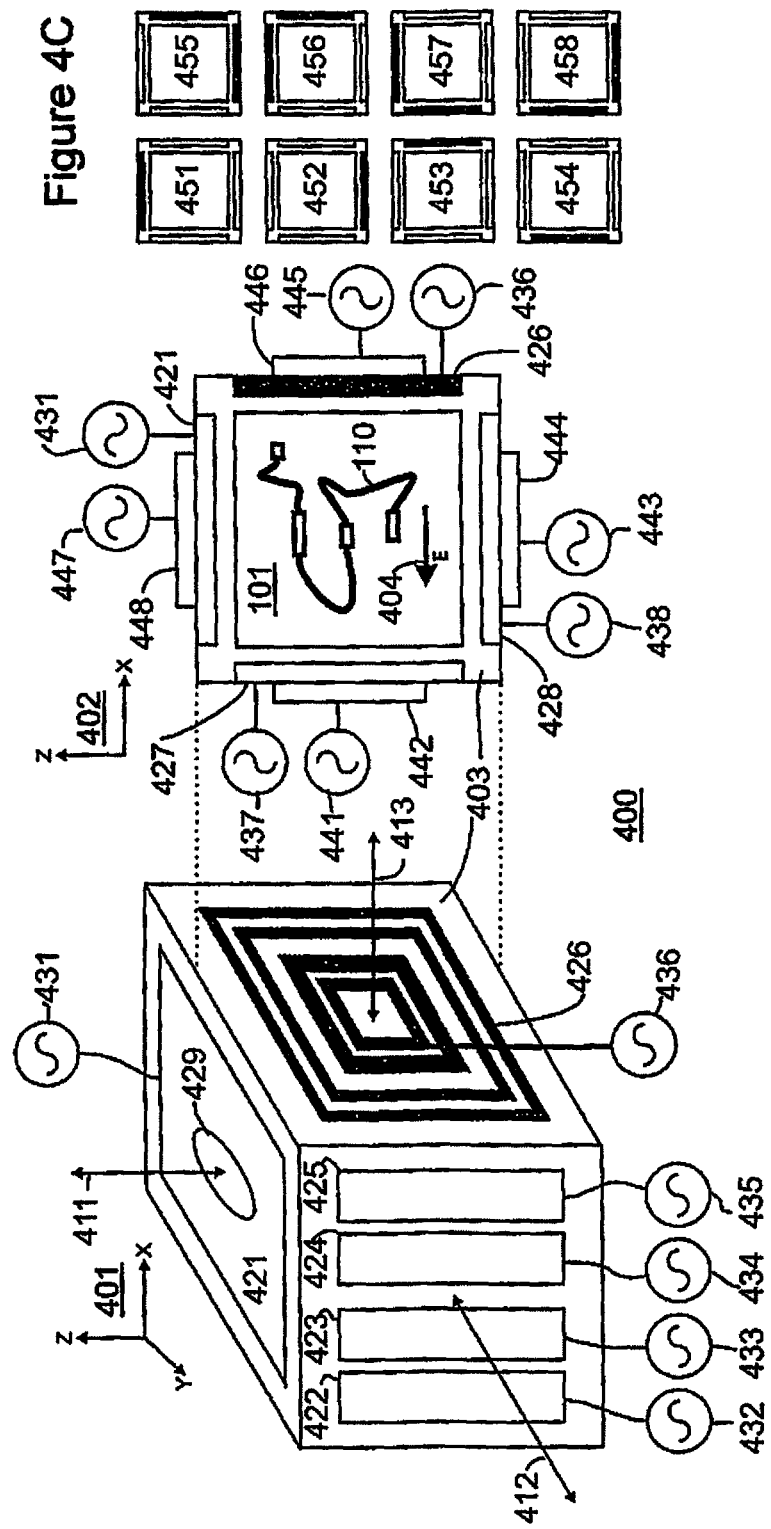

MULTI-DIMENSIONAL SPECTROSCOPY OF MACROMOLECULES

RELATED APPLICATIONS

This application claims the benefit under 35 USC 119 (e) of Provisional Application 63/059,298 filed Jul. 30, 2020 the disclosure of which is incorporated herein by reference.

This disclosure is related to disclosures relating to a spectrometer disclosed in the patent entitled High Efficiency Multiplexing, hereafter "HEMS patent" by the present inventors described in U.S. Pat. No. 10,585,044 issued Mar. 10, 2020, the disclosures of which are incorporated herein by reference.

This disclosure is related to disclosures relating to a field programmable analog array, hereafter "FPAA patent" by the present inventors described in US Provisional application 62/978,671 filed on Feb. 19, 2020, and in U.S. patent application Ser. No. 17/178,551 and PCT application PCT/CA2021/050177 both filed Feb. 18, 2021 the disclosures of which are incorporated herein by reference.

This disclosure is related to disclosures relating to an electric signal analyzer is a High Resolution Multiplexing System, hereafter "HRMS patent" by the present inventors described in US application 62/767,186 filed Nov. 14, 2018, and in U.S. patent application Ser. No. 16/683,357 published in May 2020 as US2020/0150036, the disclosures of which are incorporated herein by reference.

This disclosure is related to an application entitled Directed Orientation Chemical Kinetics U.S. 63/059,288 filed on Jul. 31, 2020, hereafter referred to as the DOCK patent, filed contemporaneously with the present application the disclosure of which is incorporated herein by reference.

The invention relates to a method for measuring multi-dimensional spectra of macromolecules and to spectroscopy of macromolecules in general with particular application to biological molecules which can be used for detecting presence of a target molecule in a sample volume containing sample molecules.

BACKGROUND OF THE INVENTION

Information about the structure and dynamics of biological macromolecules is vital to life sciences industries. Vibrational spectroscopy has been used to study the gross composition, conformation and dynamics of biological macromolecules. Conventional vibrational spectroscopy provides information about the ensemble average properties of biological macromolecules and ensembles thereof. Biological macromolecules may contain multiple repeats of same or similar groups of atoms (functional groups) whose spectral features are dominated by interactions within the group and with solvating molecules. However, longer range interactions within and between macromolecules causes a relaxation of selection rules and perturbs energy levels within the functional groups. Further, the configuration of a macromolecule is dynamic with small scale (within a functional group) reconfiguration occurring on a time scale of tens of femto-seconds. Overall reconfiguration requiring hundreds to thousands of specific small scale reconfigurations takes significantly longer, typically micro-seconds. The ensemble average spectra hence include contributions from multiple functional groups with similar, but non-identical energy levels. The transition energies (and photon frequencies) among similar functional groups within a macromolecule are typically separated by less than their mutual line widths and are not resolved. There is hence a need for a method that can separate the spectral contributions of similar functional groups on different regions of a macromolecule.

Conventional two-dimensional methods utilize femto-second laser pulses to create excited states and exploit coupling between proximate functional groups. While conventional two dimensional spectroscopy methods are useful for identifying interactions between functional groups and examining anharmonicity in the molecular potential energy function, conventional methods do not distinguish between similar, but spatially separated interactions. Further, the signal to noise achievable is limited by intrinsic variability in laser pulse energy.

SUMMARY OF THE INVENTION

According to the invention there is provided a method for obtaining information relating to a target molecule in a sample volume containing sample molecules comprising:

applying a sequence of temporally varying fields in a field direction to the sample volume caused by acoustic forces and/or by electromagnetic fields including electric fields and magnetic fields, or any combination thereof;

wherein the sequence of temporally varying fields is chosen to produce a temporal sequence of at least two different perturbed molecular configurations for said target molecule in the sample wherein the perturbed molecular configurations are at least in part correlated with the direction and temporal dependence of said applied fields;

for at least two of said perturbed molecular configurations in said temporal sequence of perturbed molecular configurations directing probe radiation incident on the sample molecules wherein at least one wavelength in the incident probe radiation beam interacts with at least one sample molecule;

collecting interaction radiation that has at least in part interacted with at least one molecule in each of said at least two perturbed configurations;

measuring a temporal sequence of amplitudes of interaction radiation collected for a plurality of directions and/or polarizations which are related to the field direction.

for each field direction and polarization, separating amplitudes that are related to the temporal sequence of applied fields from amplitudes that are not related to the temporal sequence of applied fields;

and obtaining information relating to a target molecule from amplitudes that are related to the temporal sequence of applied fields.

Preferably said probe radiation incident on the sample molecules is directed as a sequence of probe radiation.

Preferably a first temporal sequence of fields causes at least one target molecule to assume a first configuration state related at least in part to the directions of the first temporal sequence of fields; a second temporal sequence of fields causes said at least one target molecule to assume a sequence of configuration states that are perturbed relative to the first configuration state and interaction radiation is measured for at least two configuration states perturbed relative to said first configuration state.

Preferably time periods associated with the applied fields and with the perturbed molecular configurations are different.

Preferably, for each applied field, amplitudes of interaction radiation are measured at plurality of different times offset from the time each applied field is applied and wherein the time interval between measurements is less than the time interval between applied fields.

Preferably, for each applied field, a temporal sequence of probe radiation is applied and interaction radiation is measured for each probe radiation in the sequence of probe radiation.

Preferably the temporally varying fields are periodic and at least two fields in the sequence have different frequencies.

Preferably a sequence of target molecule configurations is related to the frequency of the temporally varying field and an amplitude of interaction radiation is measured at a measurement frequency that is at least twice the frequency of the temporally varying field.

Preferably at least one temporally varying field is aperiodic and the amplitude of interaction radiation is measured at time intervals less than the minimum time interval between changes in the applied field.

Preferably the configuration of the target molecule changes with time in response to an applied field and the amplitudes of interaction radiation are made at least two different times.

Preferably the configuration of the target molecule depends at least in part on a dynamical property of the target molecule wherein the dynamical property is a mass or moment of inertia.

Preferably the configuration of the target molecule depends at least in part on an interaction between the target molecule and another molecule.

This method can be used for identifying from the measured amplitudes a signature indicative of the target molecule by comparison to a reference spectrum obtained from previous experiments or available from literature so as to detect presence of the target molecule in the sample volume.

The concept herein provides a multi-dimensional spectroscopy method wherein a target molecule in an initial configuration is perturbed by a temporal sequence of disturbances to generate a temporal sequence of perturbed configurations and one or more properties of the target molecule are measured for at least one perturbed configuration.

The term "configuration" herein refers to the set of atomic coordinates for the target molecule relative to a fixed measurement frame of reference. The set of atomic coordinates determines both the shape and orientation of the target molecule.

The term "molecule" herein refers to a group of atoms that act dynamically as a cohesive unit due to mutual interactions among its members. The group may be of any size ranging from small solvent molecules such as water to biological macromolecules such as proteins. In large molecules, the degree of correlation between atomic movements is higher between atoms within the group that are proximate than between atoms within the group that are distant. The terms "molecular fragment" or "portions thereof" herein refers to a subgroup of atoms with a higher degree of dynamical correlation within the subgroup than with the molecule as a whole. A subgroup of atoms may for example be a chemical functional group such as an amino group. A subgroup of atoms may for example be a side chain of a macromolecule. A subgroup may for example be a domain within a protein. The term "perturbed configuration" herein means that the mean atomic coordinates of the target molecule, if it were in the ground quantum state, are different from the mean atomic coordinates for the initial configuration in the ground quantum state. That is the ground state atomic coordinates of perturbed and unperturbed molecules are compared. The temporal sequence of disturbances may be electromagnetic, acoustic or any combination of electromagnetic and acoustic.

In a sample at thermal equilibrium, each molecule or portion thereof undergoes thermally activated reconfigurations among a plurality of potential energy minima. The potential energy function includes terms describing the electronic configuration of the molecule (covalent bonds), hydrogen bonds, Van der Waals interactions, ionic interactions. Reconfiguration here means that at least one atom of a molecule or part thereof moves from a first volume of space to a second volume of space. The time varying applied sequence of disturbances perturbs the potential energy function. The disturbance may be an electromagnetic field applied directly or an acoustic disturbance that imposes electromagnetic effects indirectly via inter-molecular interactions. The minimum electromagnetic field strength that may be used with the method of this disclosure is just sufficient to induce a non-thermal distribution of configurations for at least one population of molecules or portions thereof. As the electromagnetic field strength increases, the deviation from a thermal population increases and new configuration states may become available to each population of molecules or portions thereof. That is a first population of molecules or portions thereof may be distinguished from a second population of molecules or portions thereof by changing the electromagnetic field strength so as to make a new set of configuration states available to said first population.

The dynamical response of each molecule or portion thereof to a disturbance depends on the applied electromagnetic field, molecular charge distribution, the distribution of mass, interactions with proximate molecules or portions thereof, and thermal excitations. The applied electromagnetic field is here taken to include possible local electromagnetic interactions from molecular collisions induced by applied acoustic waves. Each molecule or portion thereof acts as a damped oscillator driven by the applied temporally varying electromagnetic field and damped by thermal excitations and interactions with proximate molecules or portions thereof. In response to the temporally varying electromagnetic field, the molecules or portions thereof have a temporally varying preferred configuration. The temporal preferred configuration of each type of molecules or part thereof may have a different phase relationship with the applied temporally varying electromagnetic field. In a DC or slowly varying electric field, all molecules or parts thereof are in phase. As the frequency of the applied electric field increases, heavy or tightly bound molecules or parts thereof are overdriven and fall out of phase with the applied electromagnetic field. Hence by varying the frequency of the applied electromagnetic field, a first set of molecules or portions thereof may have a temporally varying first preferred configuration and a second set of molecules or portions thereof may have a temporally varying second preferred configuration. Temporally varying spectra of the sample containing the first and second sets set of molecules may be recorded using probe electromagnetic radiation polarized parallel and perpendicular to the applied electromagnetic field directions. Temporally varying acoustic spectra of the sample containing the first and second sets set of molecules may be recorded using acoustic probe waves on axes parallel and perpendicular to the applied electromagnetic field directions. The temporally varying spectra are correlated with the temporally varying electromagnetic field to isolate spectral contributions of the first preferred orientation and the second preferred orientation. The correlation may for example be performed by a lock-in amplifier or a spectrum analyzer.

In accordance with an important feature of the invention, there is provided a collection of sample molecules to be measured and an electromagnetic field generating means operable to generate a temporal sequence of electromagnetic fields incident upon the sample molecules. The sequence of electromagnetic fields may include electric fields, magnetic fields, or any combination of electric and magnetic fields. The electromagnetic field generating means may for example be a laser. The electromagnetic fields may for example be produced by a field programmable analog array shown in the above identified FPAA patent. The sample molecules may for example be contained within a channel as described in the FPAA patent.

In accordance with an important optional feature of the invention which can be used independently with any of the above or following features, there is provided a probe radiation means that directs electromagnetic radiation incident upon the sample molecules, a polarization analysis means, a radiation measurement means, and a computation means. The probe radiation means may include optical elements that regulate the wavelength(s), phase, polarization, amplitude, coherence, spatial properties, and temporal properties of the probe radiation. Preferably the probe radiation means is controlled by the computation means. The polarization analysis means is operable to transmit a selected polarization of radiation to the measurement means. Preferably the polarization analysis means is controlled by the computation means. The radiation measurement means minimally includes at least one transducer that converts electromagnetic radiation into an electric signal, and an electric signal analyzer in communication with the computation means. The electric signal analyzer may for example be an analog to digital converter (ADC). Preferably electric signal analyzer is of the type disclosed in the above cited "HRMS patent". The radiation measurement means may additionally include instrumentation means to measure the energy of radiation that has interacted with the sample molecules by wavelength, phase, coherence, spatial properties and temporal properties. The instrumentation means may for example be a spectrometer, an imaging spectrometer, an interferometer, or any combination thereof. The spectrometer may be based on the above cited "HEMS patent".

In accordance with an important optional feature of the invention which can be used independently with any of the above or following features, there is provided a lock-in amplifier operable to amplify signals at each measured wavelength that correlate with at least one frequency of the temporally varying electromagnetic field. The lock-in amplifier may be implemented as stand alone analog device in communication with the computation means or as a digital process within the computation means.

In accordance with an important optional feature of the invention which can be used independently with any of the above or following features, there is provided a spectrum analyzer. The spectrum analyzer may for example receive a temporal sequence of amplitudes for each wavelength measured from the measurement means and calculate the frequency response via Fourier Transform for each said wavelength. The frequency response at each measured wavelength may for example correlate with the reorientation rate of molecules or parts thereof contributing to spectral features at said wavelength.

In accordance with an important optional feature of the invention which can be used independently with any of the above or following features, there is provided an acoustic transmitter operable to emit acoustic waves with a probe frequency. In accordance with an important optional feature of the invention which can be used independently with any of the above or following features, there is provided an acoustic analyzer. The acoustic transmitter may for example generate ultrasonic waves at a first frequency that are incident upon, and interact with, sample molecules. The interaction with sample molecules may generate, or modulate an optical property of the sample molecules. The interaction with sample molecules may alter the amplitude, direction or frequency of acoustic waves and said alteration is measured by the acoustic analyzer. The acoustic analyzer may for example measure acoustic waves at a second frequency different from the first frequency wherein the difference between the first frequency and second frequency is due to relative motion between the acoustic analyzer and a sample molecule or part thereof (Doppler shift). The acoustic analyzer may for example measure a frequency shift between the transmitted acoustic frequency and a received acoustic frequency due to a phonon interaction.

In an embodiment that may be used in combination with any of the preceding or following embodiments, a sequence of temporally varying electric fields is applied to a sample volume containing molecules to be analyzed; at least one molecule type reconfigures from an initial configuration to at least one different perturbed configuration in response to the sequence of applied electric fields; a spectrum of the sample containing the at least one perturbed configuration is measured, wherein at least one electric field is produced by applying a voltage across the sample volume. The spectrum may be absorption, emission, refraction or scattering of electromagnetic radiation. An acoustic spectrum may be measured. A magnetic resonance spectrum may be measured. Further, in some embodiments at least one electric field in the sequence may be applied in the form of electromagnetic radiation (a flux of photons). The applied electric fields interact with the charge distribution of each molecule and may add a directional force to the pre-existing intermolecular and intra-molecular forces acting on each atom within the molecule. The molecular configuration then adjusts dynamically to the new net forces at each atom giving a sequence of perturbed configurations. The re-configuration dynamics may be fast (<1 ps) if a single unhindered step is required. The re-configuration dynamics may be slow (>1 μs) if many steps are required or there are potential energy barriers that hinder re-configuration. While the starting molecular configurations are generally at thermal equilibrium and may be described by the methods of statistical mechanics, the sequence of perturbed configurations is non-equilibrium. The present invention makes these non-equilibrium configurations available for interaction or measurement. Preferably at least one electric field in the sequence of electric fields has a frequency that is less than or equal to a reconfiguration rate of at least one molecule type in the sample. Typically the reorientation frequency is less than 1 GHz.

In an embodiment that may be used in combination with any of the preceding or following embodiments, a sequence of temporally varying acoustic waves is applied to a sample volume containing molecules to be analyzed. The acoustic waves bias molecular collisions along the transmission axis of the acoustic wave, which may cause molecules or portions thereof to preferentially orient relative to the acoustic wave propagation direction. The sequence of acoustic waves may include a first sub-sequence of acoustic waves that sets the configuration of a population of molecules or parts thereof and a second sub-sequence of acoustic waves that causes temporal evolution of the configuration states of the molecules or portions thereof. The acoustic wave may for example cause displacement and re-arrangement of solvent molecules relative to macromolecules to be analyzed. For example, the preferred direction of electric dipole moments of solvent molecules may be modulated by acoustic waves and the solvent electric dipole moments alter the electronic structure of macromolecules to be analyzed. The solvent molecules may for example be water. The sequence of acoustic waves may include a single frequency or may include a plurality of frequencies. The sequence of acoustic wave frequencies may be chirped. The acoustic waves may for example be generated by a piezo-electric element. The acoustic waves may for example be generated by moving or oscillating a magnetic object within a solution containing molecules to be analyzed by electromagnetic fields. The electromagnetic fields may be produced for example by a field programmable analog array as described in the above cited FPAA patent.

In an embodiment that may be used in combination with any of the preceding or following embodiments, the sequence of temporally varying electric fields is repeated periodically to produce a periodic temporal sequence of molecular configurations; sets of spectra are measured periodically at a constant temporal offset relative to the start of each repeat period; and the spectra for each temporal offset are correlated to provide spectra of at least one molecular configuration. The electric fields may be generated directly by applying a voltage across the sample volume or indirectly through the effect of acoustic disturbance as described above.

In an embodiment that may be used in combination with any of the preceding or following embodiments, a periodic electric field is applied to a collection of molecules; temporally varying orientation dependent spectra are measured, and the spectral signals are coupled with a lock-in amplifier to amplify spectral signals at the applied electric field frequency and a selected phase relationship with the applied electric field. This embodiment may be used for example to select a sub-group of molecules or parts thereof that oscillate with a chosen phase relationship with the applied electric field.

In an embodiment that may be used in combination with any of the preceding or following embodiments, a periodic electric field is applied to a collection of molecules; temporally varying orientation dependent spectra are measured, and the spectral amplitudes at each wavelength are analyzed with a spectrum analyzer to determine a phase relationship between the electric field frequency and the spectral response. This embodiment may be used for example to measure the phase spectrum of sample molecules at each wavelength.

In an embodiment that may be used in combination with any of the preceding or following embodiments, the sequence of applied electromagnetic fields may include one or more high frequency electromagnetic fields (ie UV, x-ray) that cause ionization or promote electrons to an excited state, and a sequence of lower frequency electric fields that change the molecular configuration by acting on the altered electronic state.

In an embodiment that may be used in combination with any of the preceding or following embodiments, a sequence of electric fields is applied to a collection of sample molecules; a sequence of polarized spectra of the sample molecules is measured; and the sequence of polarized spectra is analyzed to provide information about at least one dynamical property of the sample molecules. The dynamical property may for example be the mass or a moment of inertia. Each applied electric field may for example induce a different preferred orientation on at least some of the sample molecules or parts thereof. The degree of molecular orientation may for example depend upon the strength and duration of the applied electric field. Polarized spectra for each different preferred orientation may be different.

In an embodiment that may be used in combination with any of the preceding or following embodiments, the probe radiation is at least partially polarized. The probe radiation may be linearly polarized and for example interact with sample molecules that have at least a vector component of a transition dipole moment in the polarization direction. The probe radiation may be right or left circularly polarized. In this case the probe radiation will interact differently with chiral molecules or portions thereof differently depending on the direction of circular polarization.

In an embodiment that may be used in combination with any of the preceding or following embodiments, probe radiation is applied to sample molecules from at least two different directions. The probe radiation may be an electromagnetic wave or an acoustic wave. Preferably the different directions are orthogonal. The probe radiation may be from a constant source of a temporally modulated sequence of pulses, for example from a pulsed laser.

In an embodiment that may be used in combination with any of the preceding or following embodiments, a sequence of magnetic fields is applied to a collection of sample molecules and for each magnetic field at least two polarizations of probe radiation interact with the interacted radiation is measured to produce polarized spectra; and the sequence of polarized spectra is analyzed to provide information about at least one dynamical property of the sample molecules. The sequence of magnetic fields may be applied during the same time intervals as electric fields are applied wherein the electric field induces a perturbed configuration and the magnetic field enhances spectral measurement of the perturbed configuration. The polarizations of the probe radiation may be orthogonal linear polarizations. The polarizations of the probe radiation may be right and left circularly polarized radiation. Each applied magnetic field may for example change the splitting between different quantum states for at least some of the sample molecules or parts thereof. The direction of applied magnetic fields may for example be coincident with the direction of incident probe radiation. The spectra may for example be magnetic vibrational circular dichroism spectra.

In an embodiment that may be used in combination with any of the preceding or following embodiments, a temporally varying magnetic field is applied to molecules that have been preferentially oriented. The applied magnetic field may for example accentuate spectral differences between a first type of molecule with a first orientation and a second type of molecule with a second orientation.

In an embodiment that may be used in combination with any of the preceding or following embodiments, an electric field is applied to a collection of sample molecules for a first time interval causing at least some of the sample molecules to orient relative to the applied electric field; the electric field is switched off; a temporal sequence of polarized spectra of the sample molecules is measured; and the temporal dependence of the polarized spectra is analyzed to provide information about an orientation relaxation process of the molecules. For example the dynamics of a solution containing protein molecules may be elucidated by measuring a temporal sequence of infrared spectra polarized parallel and perpendicular to an applied electric field direction. The electric field is applied for 1 ms causing the protein molecules to orient relative to the electric field and then the electric field is switched off. Spectra of the protein solution polarized parallel and perpendicular to the electric field direction are then measured at time intervals shorter than the reorientation period of the protein structure being measured. Experimentally, protein reorientation is typically between 100 kHz and 1 MHz, so for example a time interval of 0.0001 ms intervals (10 MHz) would be suitable to measure these motions. Shorter time intervals may be suitable for smaller scale structures. In some embodiments the temporal sequence of polarized spectra is measured with a constant flux of probe radiation. The constant flux of probe radiation may for example be provided by a black body radiation or by a continuous wave laser. In some embodiments the temporal sequence of polarized spectra is measured with a temporally varying flux of probe radiation. For example, the probe radiation may be from a pulsed laser wherein the pulse duration and pulse interval determine the temporal resolution of amplitude measurements. In this case femto-second or better temporal resolution may be achieved.

In an embodiment that may be used in combination with any of the preceding or following embodiments, a first constant electric field is applied in a first direction to a collection of molecules inducing a preferred molecular orientation relative to the first constant electric field and a second non-constant electric field is applied in a second direction to the collection of molecules and polarized spectra are of the collection of molecules are measured to provide information about a dynamical property of the molecules wherein the directions of the first constant electric field and second non-constant electric field are not collinear. Preferably the direction of the non-constant second electric field is perpendicular to the constant first electric field. Preferably the polarized spectra are measured for polarizations parallel and perpendicular to the direction of the first constant electric field.

In an embodiment that may be used in combination with any of the preceding or following embodiments, a temporally varying electric field is applied to a collection of molecules consisting of a plurality of molecular types wherein the degree of orientation induced by the electric field is greater for a first type of molecules than the degree of orientation induced for a second type of molecules. For example, the first type of molecule may have a dipole moment equal to the second type of molecule and a smaller moment of inertia than the second type of molecule. Due to the smaller moment of inertia the first type of molecule may orient relative to the applied electric field at a higher rate. The orientation dependent spectra of the first type of molecule will hence have a different temporal dependence than the orientation dependent spectra of the second type of molecule.

In an embodiment that may be used in combination with any of the preceding or following embodiments, a first constant electric field is applied in a first direction to a collection of molecules inducing a preferred molecular orientation relative to the first constant electric field and a second non-constant electric field is applied in a second direction to the collection of molecules and polarized spectra are of the collection of molecules are measured to provide information about a dynamical property of the molecules wherein the directions of the first constant electric field and second non-constant electric field are not collinear. Preferably the direction of the non-constant second electric field is perpendicular to the constant first electric field. Preferably the polarized spectra are measured for polarizations parallel and perpendicular to the direction of the first constant electric field.

In an embodiment that may be used in combination with any of the preceding or following embodiments, a periodically varying electric field is applied to a collection of molecules; the molecules orient temporally relative to the periodically varying electric field; and orientation dependent spectra of the collection of molecules are measured at least twice per electric field period (to satisfy the Nyquist Theorem). The collection of molecules may for example consist of a plurality of different types and each type of molecules orients relative to the periodic electric field with a different temporal dependence. Specifically, each type of molecule may behave dynamically as a damped oscillator with amplitude and phase of oscillation determined by the mass, moments of inertia, multipole electric moments interacting with the applied electric field, and interactions with neighboring molecules. Spectral measurements are made at least twice per electric field period to satisfy the Nyquist condition and allow molecular oscillations up to the electric field excitation frequency to be followed via changes in orientation dependent spectra. The orientation dependent spectra may for example be infrared absorption spectra wherein the absorption of radiation polarized parallel and perpendicular to the applied electric field direction varies temporally. The orientation dependent spectra may for example be Raman spectra wherein the temporally dependent spectra depend on the polarization of incident radiation, the observation direction, and the polarization relative to the observation direction. The orientation dependent spectra may for example be fluorescence spectra wherein the direction of fluorescent emission depends upon the direction and polarization of exciting radiation relative to the orientation of the emitting molecule.

In an embodiment that may be used in combination with any of the preceding or following embodiments, a periodic electric field is applied to a collection of molecules or different types; temporally varying orientation dependent spectra are measured; and the spectra are analyzed to determine the Doppler shift for at least one type of molecule to provide information about the mobility of said molecule type. The spectra may be electromagnetic or acoustic, depending upon the type of molecular reorientation to be measured. For example, an electric field may be applied to a solution containing a protein molecule and various parts of the protein molecule respond to the electric field at different rates. A hydroxyl group on the protein may reorient on a time scale of pico-seconds. Infrared spectra recorded in parallel and perpendicular to the direction of the applied electric field may exhibit a Doppler frequency shift on the order of 1 cm−1. The whole protein molecule may reorient on a time scale of micro-seconds. Acoustic spectra recorded parallel and perpendicular to the electric field direction may exhibit a Doppler frequency shift on the order of several kHz. The velocity of molecules or parts thereof depends upon the force applied as determined by the electronic structure of the molecule and electric field applied the mass and inertia of the molecule or part thereof, and interactions with neighboring molecules which may provide resisting forces. Hence different molecule types with similar rest spectra may be distinguished by different Doppler shifts.

In an embodiment that may be used in combination with any of the preceding or following embodiments, a sequence of periodic fields with different frequencies is applied to a collection of molecules of different types and the and orientation dependent spectra of the collection of molecules are measured at least twice per field period for each frequency. The orientation dependent spectra (amplitude vs wavelength) may be different for each combination of polarization, measurement direction relative to field direction, applied field frequency, and duration of the applied field. Multidimensional spectra are comprised of at least wavelength, amplitude and one or more of polarization, measurement direction relative to applied field direction, applied field frequency and duration of the applied field. The collection of molecules may for example consist of a plurality of different types and each type of molecules orients relative to the applied periodic field with a different temporal dependence for each frequency. Hence different molecule types with the same spectra in the absence of an applied field, or the same spectra in the presence of a static applied field may be distinguished by multi-dimensional spectra obtained by applying fields at different frequencies and in different directions. Specifically, each type of molecule may behave dynamically as a damped oscillator with amplitude and phase of oscillation determined by the driving frequency, mass, moments of inertia and strength of interaction with the applied field. Spectral measurements are made at least twice per applied field period to satisfy the Nyquist condition and allow molecular oscillations up to the applied field excitation frequency to be followed via changes in orientation dependent spectra. The orientation dependent spectra may for example be infrared absorption spectra wherein the absorption of radiation polarized parallel and perpendicular to the applied electric field direction varies temporally. The orientation dependent spectra may for example be Raman spectra wherein the temporally dependent spectra depend on the polarization of incident radiation, the observation direction, and the polarization relative to the observation direction. The orientation dependent spectra may for example be fluorescence spectra wherein the direction of fluorescent emission depends upon the direction and polarization of exciting radiation relative to the orientation of the emitting molecule.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

FIGS. 2A, 2B, 2C, 2D and 2E show the interaction of an oriented molecule with incident radiation.

FIG. 4A is a schematic isometric view of a second sample cell and spectroscopy arrangements for measuring spectra of molecules in the sample cell according to the present invention.

FIG. 4B is a side elevational view of the sample cell of FIG. 4A.

FIG. 4C shows a set of electrode voltage configurations for the arrangement of FIG. 4B.

DETAILED DESCRIPTION

Embodiments of the present disclosure are described in detail with reference to the accompanying drawings. Detailed descriptions of constructions or processes known in the art may be omitted to avoid obscuring the subject matter of the present disclosure. Further in the following description of the present disclosure, various specific definitions found in the following description are provided to give a general understanding of the present disclosure, and it is apparent to those skilled in the art that the present disclosure can be implemented without such definitions.

Figure 1:
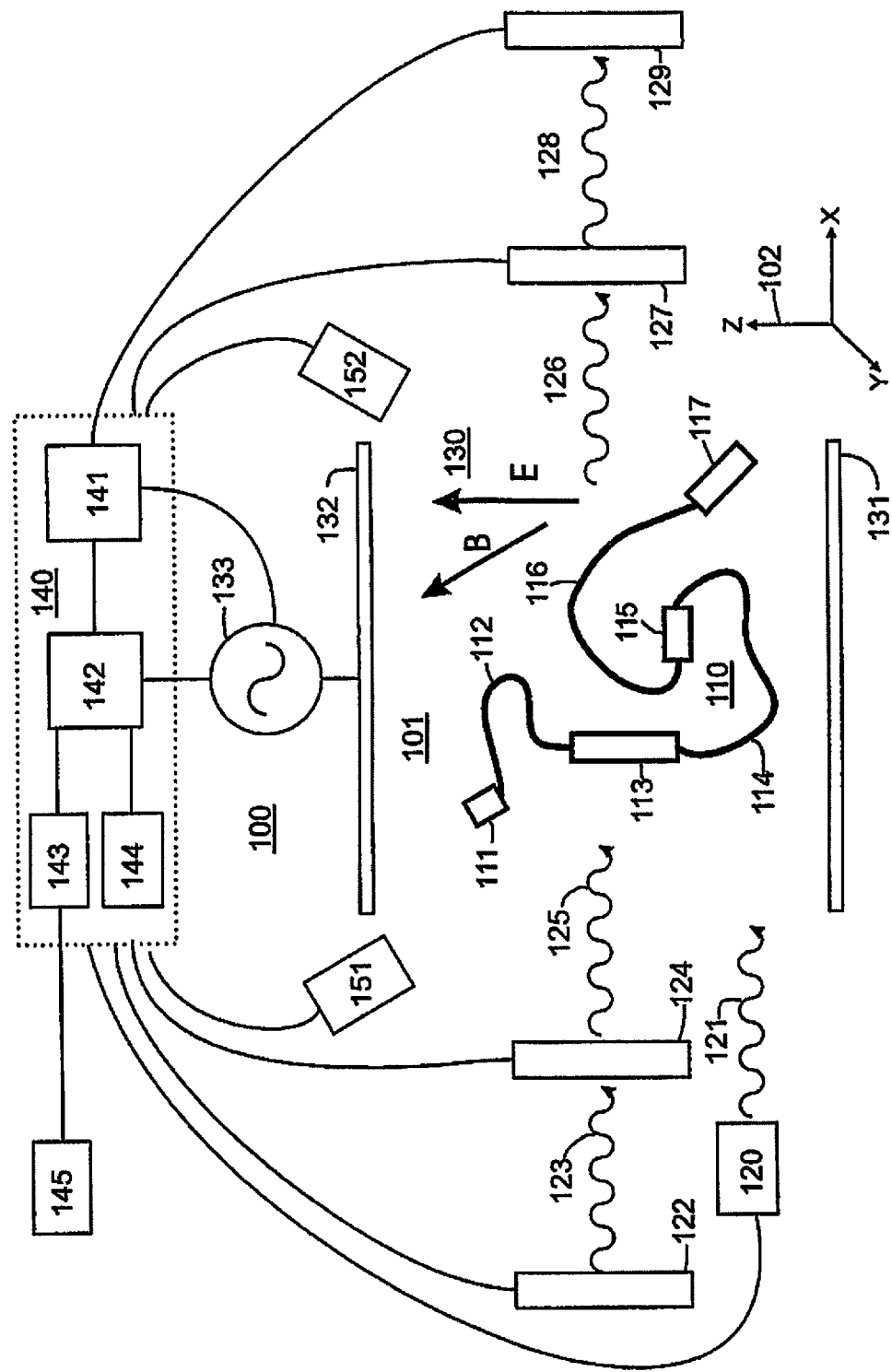
FIG. 1 is a schematic illustration of an arrangement for multi-dimensional spectroscopy according to the present invention.

An arrangement for multi-dimensional spectroscopy is indicated generally at 100 in FIG. 1. A volume containing a collection of sample molecules is indicated generally at 101 with apparatus to generate electromagnetic fields in the sample volume indicated generally at 130. The apparatus 130 to generate electromagnetic fields may for example be a field programmable analog array as described in the above cited FPAA patent. As shown an electric field is generated between plate 131 held at a reference voltage and plate 132 in communication with voltage source 133. Voltage source 133 produces a temporal sequence of voltages according to signals received from computation device 142 of control 140. The voltage difference between plates 131 and 132 may for example peak at 10 volts with a separation of 10 microns to give maximum electric field strength of 1,000,000 V/m. Other voltages and separations may be used. As indicated at 102, the electromagnetic field apparatus 130 may be three dimensional and operable to generate electric and magnetic fields with components in any direction.

A representative sample molecule 110 consists of rigid segments 111, 113, 115 and 117 joined by flexible segments 112, 114, and 116. Each segment may orient in relation to electric and magnetic fields indicated as E and B generated by electromagnetic apparatus 130 with motion constrained by neighboring segments. For example, rigid segment 113 may have a dipole moment along the segment axis which interacts with the electric field to produce a force toward alignment with the electric field. The dipole interaction force toward alignment may be resisted by flexible segments 112 and 114 together with solvent effects. The dynamics of the alignment of a segment dipole moment with the applied electric field depend on the mass and moments of inertia, the magnitude and direction of the dipole moment relative to the applied electric field, and restraining forces due to solvent and neighboring segments. For example, segment 111 having a smaller mass and moment of inertia may align with an applied electric field faster than segment 113. For example segment 115 may align slowly due to resistive forces from segments 114 and 116. In general, the rate at which each segment 111, 113, 115 and 117 orients in relation to an applied electric field may be different. Spectra of the sample molecules may be measured at different stages of temporal evolution of orientation. Probe radiation source 122 emits radiation 123 which may be polarized by polarizer 124 to produce polarized radiation 125 incident on sample molecule 110. Interaction radiation 126 exits the sample region after incident radiation 125 has interacted with sample molecules 110. Interaction radiation 126 may have a wavelength dependent change in amplitude due to absorption. Interaction radiation 126 may be Raman scattered at wavelengths different from incident radiation 125. Interaction radiation 126 may be emitted by sample molecules 110, for example fluorescence. Interaction radiation 126 may pass through a polarization analyzer 127 and radiation with a selected polarization 128 is measured by a measurement device 129. Measurement device 129 may simply measure the amplitude of radiation 128. Measurement device 129 may be a spectrometer that measures the amplitude of radiation 128 as a function of wavelength.

States of sample molecule 110 may be manipulated prior to measurement by application of "pump" radiation 121 from radiation source 120.

Pump radiation may interact with sample molecules 110 or parts thereof to produce excited states giving sample molecule 110 a time dependent (as the excited states relax) spectrum. Pump radiation 121 may also induce a change in the charge distribution of sample molecule 110, which in turn alters the dynamic response of sample molecule 110 to temporally varying electromagnetic fields. That is pump radiation may alter both the spectrum of sample molecule in a stationary frame of reference and the sequence of orientations of sample molecule 110 in a temporal series of measurements.

As indicated at 151, an acoustic transmitter may direct ultrasonic waves into the sample region 101. The ultrasonic waves may interact with sample molecules 110 and subsequently be measured with acoustic analyzer 152. Preferably acoustic measurements are made in directions parallel to the direction of molecular motion and perpendicular. The parallel measurement may exhibit a Doppler shift in frequency relative to the perpendicular component. The direction of motion may be set by the directions of a sequence of applied electromagnetic fields. As indicated by the cable links, the transmission and reception of acoustic waves are coordinated by control device 140. Each segment of sample molecule may reorient in response to a temporal sequence of electromagnetic fields at different rates. For example, the motion of segment 115 may cause a Doppler shift in the frequency of reflected acoustic waves measured by acoustic analyzer 152. This measurement is complimentary to the polarization dependent spectral measurements. That is the spectral measurements provide information about the position (orientation) of a molecular segment and the acoustic measurements provide information about the velocity of a molecular segment. Acoustic waves may also be used as a pump pulse to change the state of a sample molecule prior to, or during as sequence of spectroscopic measurements. For example, an acoustic wave is transmitted by molecular collisions along a propagation axis. Such collisions may for example disrupt ordering of structured solvent molecules such as water proximate to a sample molecule, thereby altering the spectral response of the sample molecule.

Signals from measurement device 129 are transmitted to signal analyzer 141 integral to control device 140 together with signals from voltage source 133. Signal analyzer 141 may for example be a spectrum analyzer or a lock in amplifier that temporally correlates each signal from measurement means 129 with the voltage source 133 (and by extension electric field). The temporal correlation may be performed for each wavelength measured. Multi-dimensional spectra may be assembled by adding temporal dependence, polarization dependence, excitation dependence and electromagnetic fields to wavelength-amplitude spectra. Signal analyzer is in communication with computation device 142 which may assemble and analyze multi-dimensional spectra. The multi-dimensional spectra may be stored in a machine readable storage means 144 or transmitted via communication port 143 to an external computation device 145.

FIG. 2A shows a molecular segment 213 with axis D as shown at 214 aligned with an applied electric field E. The molecular segment 213 has, at the measurement time to +Ti, the same orientation relative to the applied electric field as segment 527 in FIG. 5. Molecular segment 213 may include a plurality of transition dipole moments. The orientation of each transition dipole moment relative to the molecular segment axis D depends upon the respective wave functions of initial and final quantum states for the absorption of a photon. In general, the transition dipole moments are not parallel to the molecular segment axis D. Although this example pertains to absorption from fixed transition dipole moments, the methods described also apply to scattering (Raman, Brillouin) and non-linear optical effects. Two example transition dipole moments $d_i$ and $d_{i+1}$ are shown at 215 and 216, respectively. The probability for the absorption of a quantum of electromagnetic radiation (a photon) depends upon the dot product between each transition dipole moment and the electric field of incident electromagnetic radiation. In this example, the electric field of electromagnetic radiation incident in the y-direction may oscillate in the x-direction, z-direction, or any combination thereof as shown at 230 of FIG. 2B. In general the electric field of incident electromagnetic radiation $E_i$ is polarized at angle θ relative to the x-axis at some instant in time as shown at 231. The polarizing element 124 as shown in FIG. 1 may rotate the polarization of incident probe radiation to any angle (or induce circular polarization). As the angle of polarization is scanned, the amplitude of absorption peaks at different angles for each transition dipole moment varies as illustrated in FIG. 2C by curves 235 and 236 for transition dipole moments $d_i$ and $d_{i+1}$, respectively. Curve 235 is higher than curve 236 because the magnitude of transition dipole moment $d_i$ is greater than the magnitude of transition dipole moment $d_{i+1}$ as best shown by the projections of each onto the xy plane as shown at 237 and 238 (FIG. 2A), respectively. As shown at 239, there is an angle Δϕ between transition dipole moment projections 237 and 238 which may be resolved by directing probe radiation toward molecular segment 213 in the z-direction as indicated in FIG. 2D at 240 and rotating the axis of polarization ϕ relative the x-axis. FIG. 2E shows plots of the absorption amplitudes for $d_i$ and $d_{i+1}$ are shown at 241 and 242, respectively. In general, the absorption amplitude for each transition dipole moment will vary at each wavelength with θ and ϕ. The multi-dimensional spectrum of the molecular segment is a superposition of contributions from each transition dipole moment in the molecular segment. The multi-dimensional spectrum of a sample containing different molecular segment types is a superposition of spectra from each molecular segment type weighted by the abundance of each molecular segment type. Hence each point in θ, ϕ space has an associated spectrum comprised of amplitude and wavelength.

Figure 3B:
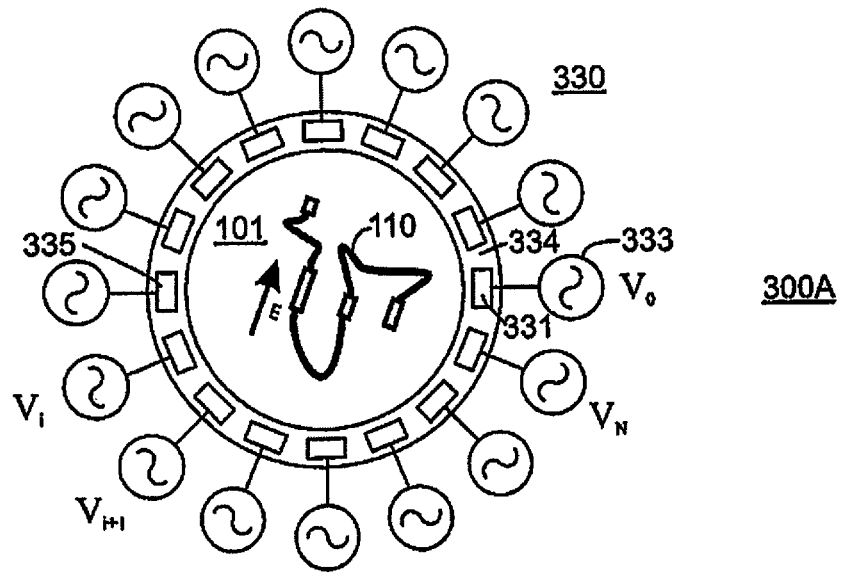
FIG. 3B is a cross-sectional view along the lines 3B-3B of FIG. 3A.
Figure 3A:
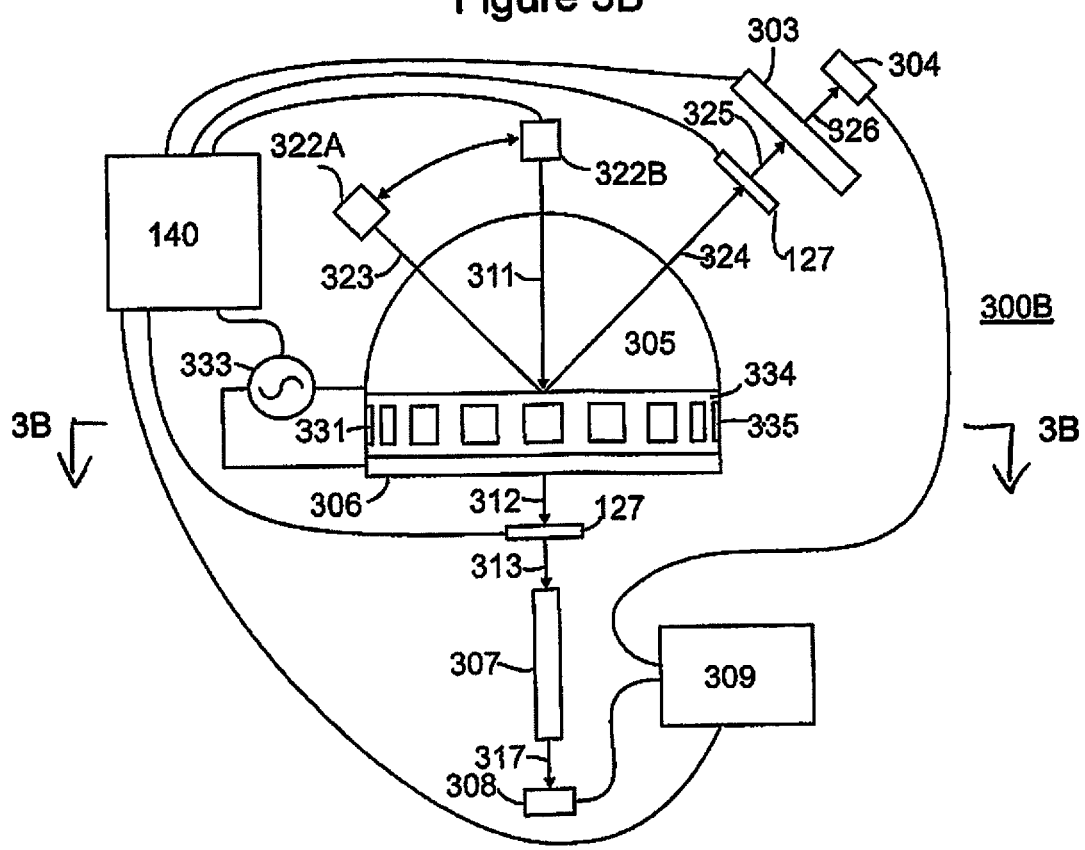
FIG. 3A is a schematic illustration showing a side view of the sample cell and two spectroscopy arrangements for measuring spectra of molecules in the sample cell according to the present invention.

FIG. 3A and 3B show side and cross-section views for an example embodiment of the invention. FIG. 3B shows a cross-section lying in a xy section generally indicated at 300A through the sample volume as indicated at 101. An array 330 of electric field sources labeled from 0 to N is symmetrically arranged around sample volume 101 containing sample molecules 110. Each electric field source includes a voltage source 333 electrically connected with electrode 331. The electrodes 331 are enclosed in insulating material 334 preventing flow of electrical current. The voltage sources 333 may be controlled independently by control means 140 (connections not shown). The voltage sources 333 may for example include digital to analog converters (DAC) and amplifier circuitry. The DAC accepts digital codes from control means 140 and outputs a temporal voltage waveform. Amplifier circuitry then boosts the voltage of the DAC output to produce desired electric field strength. The electric field strength may for example be comparable to physiological electric fields measured across cell membranes on the order of several hundred kilo volts per meter.

In another arrangement, a DAC is connected by a MUX to a plurality of voltage sources 333. Other means for generating temporally varying voltages may be used.

In operation, control means 140 may for example transmit a sequence of control codes to voltage source 333 causing a temporal voltage waveform at electrode 331 with all other electrodes held at ground potential. In this case a temporally varying electric field symmetric about an axis between electrode 331 and its diametrically opposed electrode 335 is generated. The direction of the electric field axis may be changed by supplying a voltage waveform to a different electrode in the array 330. The shape and gradient of the electric field may be modified by supplying (possibly different) voltage waveforms to a plurality of the electrodes. In general the axis of the electric field generated by electrodes 331 is in the xy plane.

FIG. 3A shows a side view of the sample cell and schematically shows key components for two spectroscopic systems. FIG. 3B is the section between electrodes 331 and 335 indicated in FIG. 3A. The system is generally indicated at 300B and the sample cell region is drawn in three dimensions. A hemispherical internal reflection element (IRE) 305 is positioned above the ring of insulating material 334. The IRE 305 may for example be Si or Ge which can also serve as an electrode as shown by connection to voltage source 333. Internal reflection elements fabricated with other materials may be used. In some cases the IRE may have a thin layer of transparent conductive material on the bottom surface to form an electrode. The transparent conductive material may for example be Indium Tin Oxide (ITO). The surface of the IRE in contact with the sample volume is coated with a thin layer of insulating material (not shown) that prevents flow of electrical current. The thin layer of insulating material may for example be spin coated polystyrene. The bottom surface of the sample cell is a conductive window 306, which may optionally include a thin layer of insulating material. The window 306 may for example be fabricated from Si or Ge. Other materials may be used. Voltage source 333 receives digital signals from control means 140 and generates a temporally varying voltage difference between the top internal reflection element 305 and the bottom window 306. The voltage difference between IRE 305 and window 306 generates a temporally varying electric field oriented along the z-axis. The net electric field in the sample volume 101 is the vector sum of electric fields generated by electrodes 305, 306 and array 330 of electrodes 311. The arrangement shown in FIGS. 3A and 3B is useful for systems with cylindrical symmetry.

FIG. 3A schematically shows optical paths for a reflection arrangement and a transmission arrangement. For simplicity, optical elements such as mirrors lenses, and prisms normally used to direct, collect and focus radiation are not explicitly shown, but are understood to be present.

For the transmission arrangement spectral light source 122 from FIG. 1 is positioned on the symmetry axis of the IRE as shown at position 322B. Spectral light source 122 produces temporally modulated (preferably pulsed) broadband radiation 311 for this example. Probe radiation 311 passes through the IRE and enters the sample volume normally (angle of incidence 0 degrees). Probe radiation 311 interacts with sample molecules 110 and interaction radiation transmitted through the sample volume is collected and directed along path 312 through polarization analyzer 127. Control 140 rotates polarizer 127 to select a polarization directed on path 313 to optical dispersion device 307. Different wavelengths of polarized interaction radiation pass through optical dispersion device 307 at speeds determined by the refractive index for each wavelength and follow path 317 to detector 308. Each wavelength in the pulse of polarized interaction radiation arrives at detector 308 at a different time. The temporal photon flux at the detector is the temporal dependence by wavelength convoluted with the temporal pulse shape. Optical dispersion device 307 may for example be a long optical fiber wound around a cylinder for compactness. Detector 308 may for example be a photo-diode or a photo-multiplier tube. Electrical signals from detector 308 are transferred to temporal signal analyzer 309 in communication with control 140. The temporal signal analyzer may for example be a conventional analog to digital converter (ADC). Preferably the temporal signal analyzer is the device described in the above cited HRMS patent which provides better temporal resolution and a better signal to noise ratio than a conventional ADC.

For the reflection arrangement spectral light source 122 from FIG. 1 is shown at position 322A making an angle of incidence greater than zero with the IRE sample interface. The angle of incidence in this arrangement is adjustable and together with the refractive index of the IRE material controls the depth of penetration of an evanescent wave into the sample volume. Probe radiation is incident along path 323, interacts with sample molecules 110 via evanescent wave penetration into sample volume 101 and is reflected along path 324. The polarization of interaction radiation along path 324 is modulated by polarizer 127 receiving control signals from control means 140. Polarized interaction radiation continues along path 325 to spectrometer 303. Spectrometer 303 modulates radiation output along path 326 to detector 304, which may include a plurality of detection elements. Spectrometer 303 may for example be a dispersive grating spectrometer that directs each wavelength along a different path 326 to a different detector element of detector 304. Spectrometer 303 may for example be a Fourier Transform spectrometer operated in step scan mode. Spectrometer 303 may for example be the arrangement described in the above cited HEMS patent with a plurality of detector elements. Electrical signals from each detector element are transmitted to temporal signal analyzer 309 which quantifies the amplitude of each signal with respect to time and relays quantified signals to control 140.

For transmission and reflection measurements described above, the temporal evolution of the spectral signal at detectors 304 and 308 is correlated with the sequence of electric fields produced by electrode array 330, and electrodes 305 and 306 by control 140. That is the temporal sequence of electric fields produces a temporal sequence of perturbed sample molecule conformations and each perturbed conformation may give a different spectral signal.

FIGS. 4A, 4B and 4C shows a rectangular sample cell configured to generate temporally varying three dimensional electric fields in sample volume 101 generally indicated at 400. Each voltage supply indicated in FIG. 4A and 4B, specifically 431, 432, 433, 434, 435, 436, 437, 438, 441, 443, 445, and 447 is in communication with and controlled by control means 140 indicated in FIG. 1. For simplicity connections to control means 140 are not shown in FIGS. 4A and 4B. In the region indicated at 401 the sample cell is drawn in perspective view in three dimensions. Structural elements and inner faces of the sample cell are comprised of electrically insulating material 403 which prevents flow of electrical current. In an alternate arrangement used for electrochemical studies (not shown), the electrodes may be positioned to allow electrical current flow in the sample volume. Three example electrode configurations are illustrated. The top panel electrode 421 linked with voltage supply 431 has an aperture 429 through which electromagnetic radiation may pass to or from the sample volume 101 as indicated at 411. The front panel illustrates another arrangement with four electrodes 422, 423, 424 and 425 and corresponding voltage supplies 432, 433, 434, and 435. Each electrode may be held at a different voltage to generate a spatially and temporally varying electric field in the sample volume 101. The gradient in a spatially varying electric field may be used for example to translate molecules via interaction with a molecular dipole moment. As indicated at 412, radiation may pass into or out of the sample volume through gaps between the electrodes. The electrodes 422, 423, 424, and 425 may be arranged to filter or diffract radiation as discussed in more detail within the above cited FPAA patent. Briefly, the electrodes may function to produce electric fields acting on molecules in the KHz to GHz range and act as optical elements for radiation interacting with sample molecules at THz and higher frequencies. The side panel electrode 426 linked with voltage supply 436 is shaped to act as a Fresnel lens for radiation entering or exiting sample volume 101 along path 113. In this example, the Fresnel lens may be used to focus incident radiation to a point within the sample volume while generating a spatially uniform electric field within the sample volume.

A cross sectional view of the sample cell in FIG. 4B is generally indicated at 402. In cross section it is seen that the electrically insulating material 403 encloses sample volume 101 with sample molecules 110 oriented by the electric field indicated at 404. The insulating material 403 is of sufficient thickness to prevent the flow of electrical current in sample volume 101. Further insulating material 403 may be shaped to limit the sample volume to an interaction volume in which the electric field is uniform within a threshold tolerance. As shown, voltage is applied from source 436 to generate a positive charge on electrode 426 (indicated by shading) and a negative charge on opposing electrode 427 via source 437. A perpendicular electric field component may be generated by applying different voltages at electrodes 421 and 428 via voltage sources 431 and 438, respectively. A series of example voltage configurations in the xz plane is illustrated in FIG. 4C at 451, 452, 453, 454, 455, 456, 457 and 458. Electrodes with positive voltage are shaded black. Each example represents one possible state in a temporal sequence of electric field states. Referring to the coordinate system given at 402, configurations 451 and 452 produce electric fields in the −z and +z directions, respectively. Similarly, configurations 453 and 454 produce electric fields in the −x and +x directions, respectively. Configuration 455 produces an electric field diagonal to the sample cell in the −x+z direction. Configuration 456 produces an electric field diagonal to the sample cell in the −x−z direction. Configuration 457 produces an electric field diagonal to the sample cell in the +x−z direction. Configuration 458 produces an electric field diagonal to the sample cell in the +x+z direction. In general, the sequence of electric fields includes at least two different electric fields that differ in direction by more than zero degrees and less than 180 degrees. For example, configurations 451 and 452 differ by 180 degrees, so a sequence including configurations 451 and 452 must also include at least one of configuration 453, 454, 455, 456, 457, or 458. Further, the magnitude of voltage (and electric field) may vary for each electrode activated.

Referring to FIG. 4B, voltage sources 441, 443, 445 and 447 may be configured to generate and measure voltage. In this case the voltage source may for example include DAC, ADC and amplifier circuitry. In transmit mode, the voltage source 441 receives a sequence of signals from the control means 140 and DAC circuits a temporally varying voltage causing transducer 442 to vibrate and generate an acoustic wave propagating into sample volume 101. In receive mode, transducer 442 vibrates under the influence of incident acoustic waves and generates a voltage received by ADC circuits in voltage source 441 which convert the voltage to digital form and transmit digital signals to control 140. Acoustic transducers 444, 446, and 448 together with their voltage sources 443, 445, and 447 operate in the same manner as transducer 442 and voltage source 441. The acoustic transducers may perform two distinct functions. Firstly, acoustic waves interact with sample molecules 110 via molecular collisions providing momentum transfer in the direction of wave propagation. Control 140 may activate a sequence of acoustic waves in concert with a sequence of electrical fields to effect a change in conformation of a sample molecule. That is the impulsive force from acoustic waves may overcome a potential energy barrier to conformational change wherein the energetically favorable conformations are determined by the electric fields. Secondly, acoustic waves may be used to probe molecular movement via Doppler shifts. In this mode, a sequence of electric fields causes a molecule or molecular fragment to move and an acoustic wave interacting with the moving molecule or molecular fragment is Doppler shifted. Since the velocity of acoustic waves is typically 5 orders of magnitude less than the velocity of light, the relative Doppler shift is larger and easier to measure.

Figures 5A, 5B:
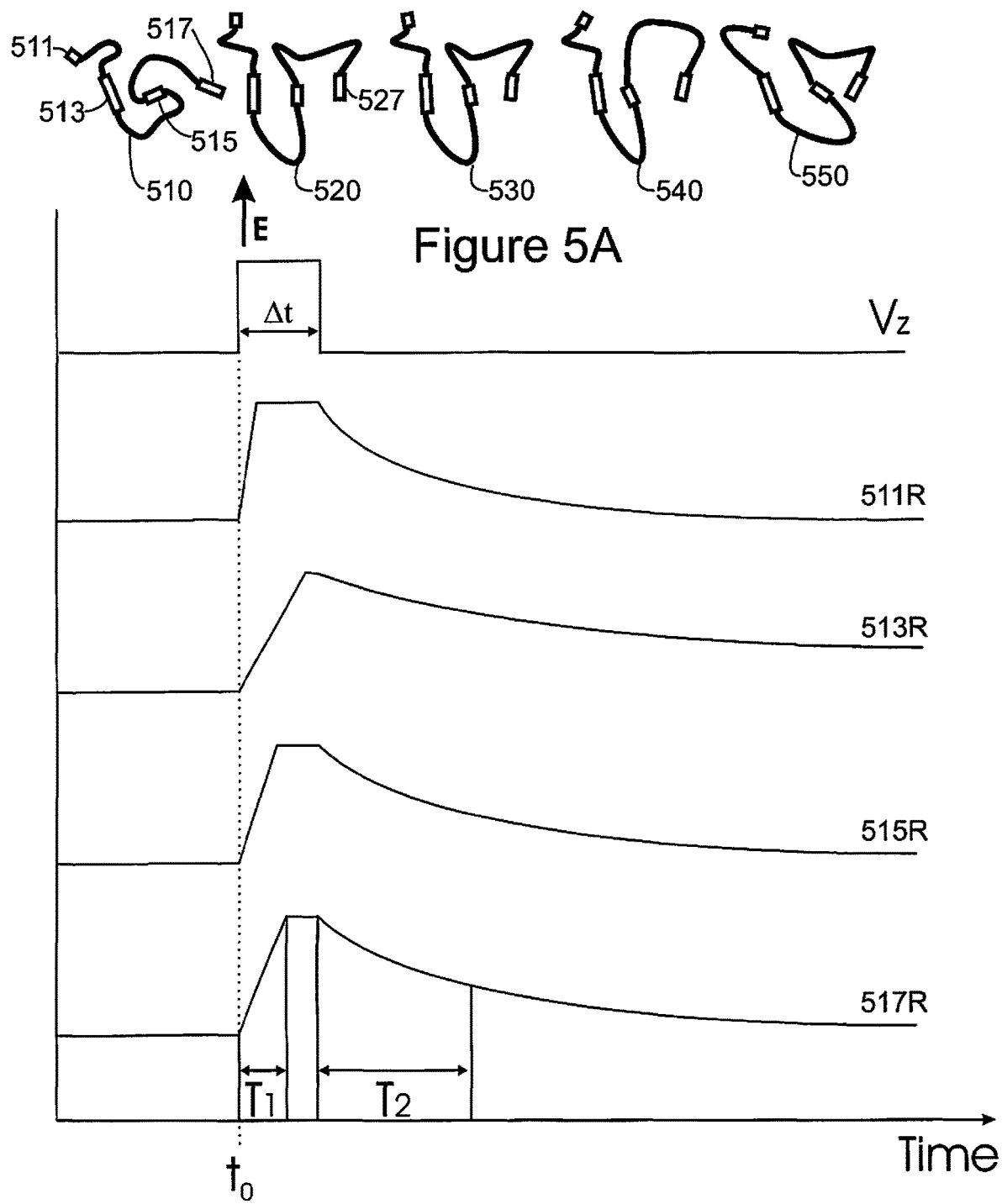
FIG. 5A shows a series of configurations of a sample molecule.
FIG. 5B illustrates the temporal response of the molecule of FIG. 5A showing the responses to the molecular orientation to an electric field impulse.
Figures 6A, 6B:
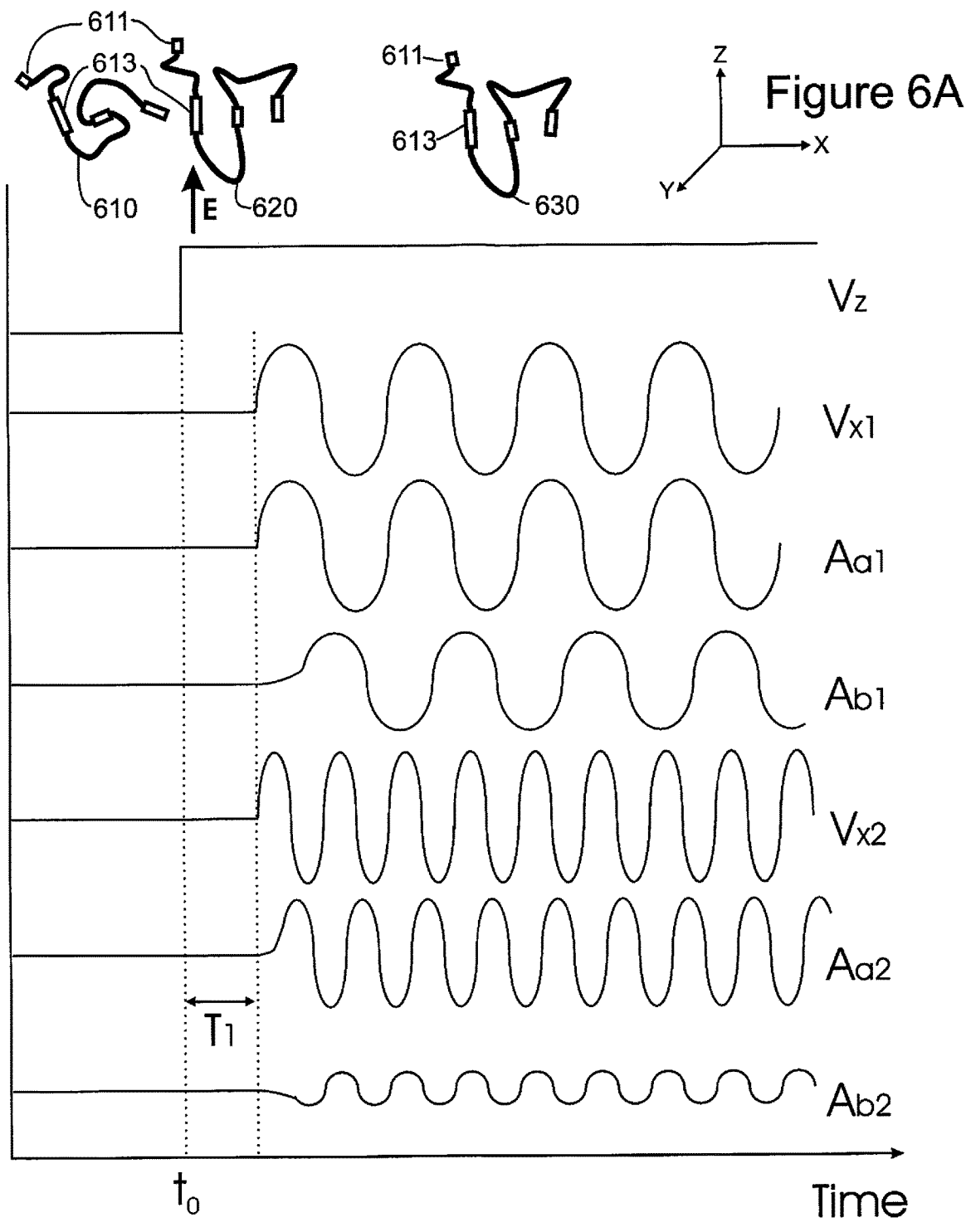
FIG. 6A shows a series of configurations of a sample molecule.
FIG. 6B illustrates the temporal response of the molecule of FIG. 6A showing the responses to the molecular orientation to periodic electric fields.
Figure 7:
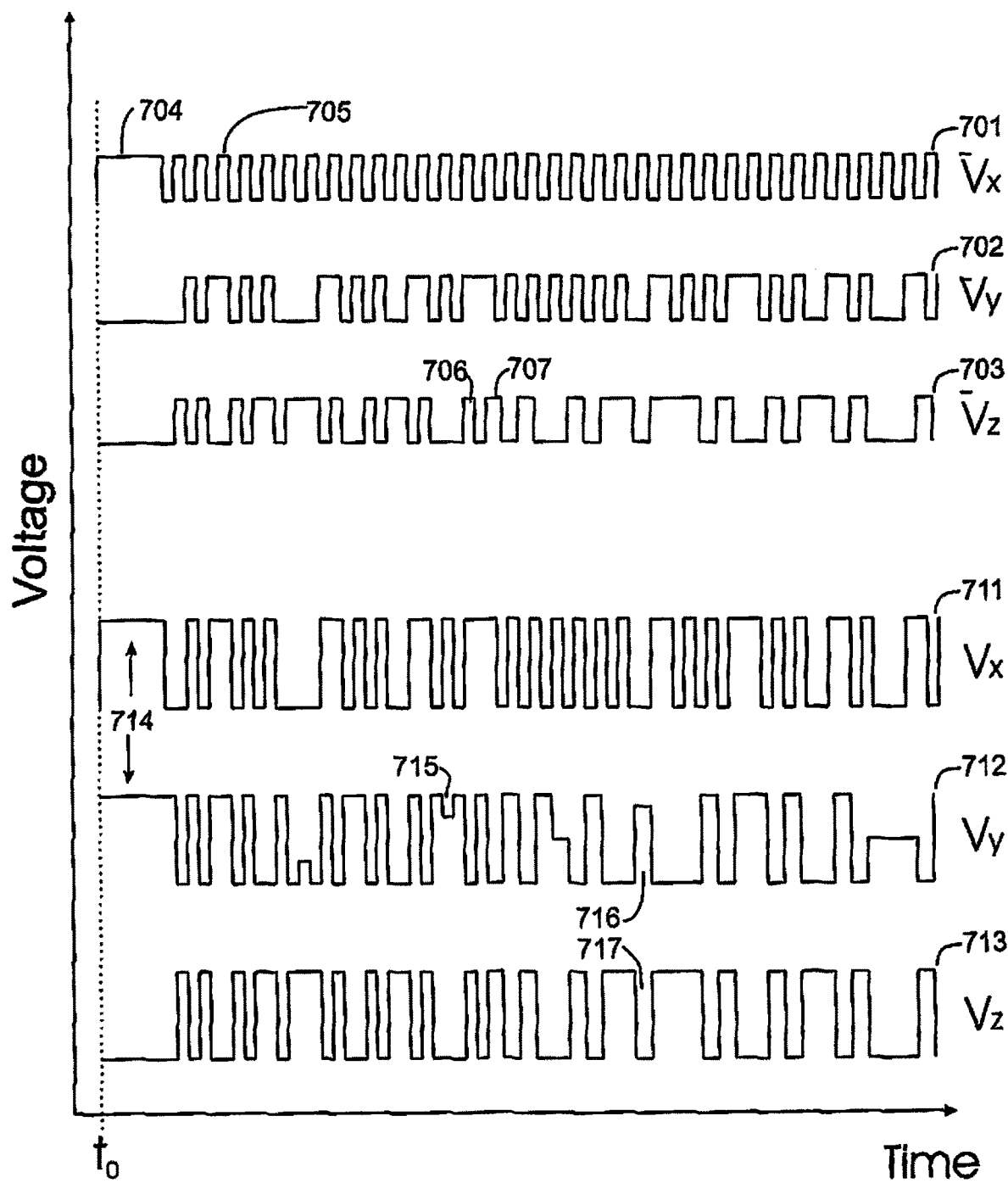
FIG. 7 illustrates the temporal response of molecular orientation to a pseudo-random sequence of electric fields.

FIGS. 5B, 6B and 7 give simple non-limiting illustrative examples of electric field sequences that may be used with arrangement of FIG. 1 to produce spectra with dimensions of amplitude, wavelength (or frequency equivalent), temperature, polarization state, electric field amplitude and frequency, and temporal evolution. Complex sequences of electromagnetic fields may be applied to sample molecules to selectively enhance spectral signals from a first selected sample molecule or portion thereof and a second sample molecule. For example, a sequence of electromagnetic fields may include a pump pulse that alters the quantum state of a selected sample molecule and a subsequent electromagnetic field alters the configuration and/or orientation of the selected sample molecule due at least in part to electromagnetic interactions with the altered quantum state. For example, a sequence of electromagnetic fields may alter the configuration/orientation of a selected sample molecule in a way that a subsequent pump pulse selectively interacts with a first molecular transition and not with a second molecular transition of the same or similar energy. For example, the sequence of electromagnetic fields orients a first transition dipole moment parallel to the polarization of probe radiation and a second transition dipole moment perpendicular to the polarization of probe radiation. The transition energies of the first transition dipole moment and second transition dipole moment may be identical, but only the first transition dipole moment interacts with the probe radiation. If the polarization of the probe radiation is rotated by 90 degrees, only the second transition dipole moment interacts with the probe radiation. This contrasts with a sample at thermal equilibrium in which the first and second transition dipole moments are both randomly oriented and equally likely to interact with probe radiation of any polarization. While orthogonal alignment of the first and second transition dipole moments provides maximal spectral contrast between contributions from the two transition dipole moments, the spectral contrast for angles between average transition dipole moment orientations less than 90 degrees may provide sufficient spectral contrast to separate the spectral contributions of the first and second transition dipole moments. The spectral contrast between a first transition dipole moment and a second transition dipole moment may be enhanced by making a temporal series of measurements in which the average angle between the transition dipole moments varies with time. For example, the first and second transition dipole moments may each have a preferred orientation following a sequence of electromagnetic fields. After the electromagnetic fields are switched off, the average orientation of each transition dipole moment may decay to a random orientation at a different rate. The difference in orientation decay rate is sufficient to distinguish between the spectral contributions of each transition dipole moment. For example, the sequence of electromagnetic fields may include a plurality of pulses wherein the time between pulses is varied. A first transition dipole moment may retain residual orientation between successive pulses and become stepwise more oriented. A second transition dipole moment may become oriented by each pulse and decay to a random orientation between pulses. By varying the pulse rate, the spectral contributions of the first and second transition dipole moments may be separated based on the difference in dynamical properties.

FIG. 5B illustrates the differential orientation of molecular segments of FIG. 5A in response to an electric field impulse. The top curve in FIG. 5B indicated at 521 is a plot of voltage applied to generate an electric field in the z direction. The voltage is initially zero as indicated at 531 and increases to voltage $V_z$ at time to as indicated at 532. The voltage is applied for a time t as indicated at 533 and switched off at time $t_0+t$ as indicated at 534. As shown in FIG. 5A, molecule 510 with rigid segments 511, 513, 515, and 517 is initially in a disordered state. Spectra of molecules in the disordered state are independent of the direction and polarization of incident radiation. The projections of molecular segments 511, 513, 515, and 517 onto the z-axis as a function of time are given in curves 511 R, 513R, 515R, and 517R, respectively. As indicated at 518 on curve 511 R, the average orientation of segment 511 with respect to the z axis is zero: that is there is no preferred orientation. The molecular segments 511, 513, 515, and 517 each align with the applied electric field with a different characteristic time constant T1 as illustrated by curves 511 R, 513R, 515R, and 517R, respectively. The temporal evolution of the configuration of molecule 510 is shown schematically at 520, 530, 540, and 550. After time t>T1 for all segments, all segments are aligned with the applied electric field as shown at 520. A short time after the electric field is switched off, the smallest segment 511 with the smallest mass and moment of inertia deviates from alignment with the z axis as shown at 530. The orientation of each segment decays with a characteristic time constant T2. As shown at 540, only segment 513 retains significant alignment with the z axis. As shown at 550, for times past T2 for all segments, the molecular configuration is random and different from the initial configuration. The time constant T1 depends upon the charge distribution, mass, moment of inertia, and interactions with neighboring molecules or parts thereof. For small molecules or un-entangled parts thereof, the time constant may be on the order of a pico-second or less. In some cases reorientation may require breaking covalent bonds of neighboring molecules or segments rendering alignment with the applied electric field energetically improbable: that is the time constant approaches infinity. In some cases there is a potential energy barrier to reorientation. In this case there will be a threshold applied electric field strength for which reorientation may occur. The threshold may have a statistical distribution for each segment type and each segment type may have a different distribution of threshold fields. Note that a threshold electric field is proportional to the activation energy for mobility determined by the interaction of the electric field with the charge distribution of the molecular segment. The interactions between molecular segments and neighboring molecules are constantly changing at a rate dependent upon the available energy.

The available energy may be thermal energy, in which case the thermal energy is partitioned among the available modes according to the equipartition theorem and T1 is temperature dependent. Energy for reorientation may also be directed to selected modes, for example by exciting the selected modes with electromagnetic radiation. The time constant T1 may be calculated from a temporal series of spectra recorded with polarization parallel and perpendicular to the applied electric field direction. In the example shown, the parallel polarization is in the z direction and a perpendicular polarization is any direction in the xy plane. The parallel and perpendicular polarized spectra of a molecular segment are identical in the random state. When the electric field is turned on the difference between parallel and perpendicular polarized spectra may increase, asymptotically approaching a limiting value for each wavelength. T1 is taken as the time since the electric field is turned on for the spectral difference to reach a threshold fraction of limiting value. The threshold fraction may for example be 95%. In some cases, the applied electric field may induce a long range ordering of sample molecules that corresponds with a local or global potential energy minimum. In these cases the ordering (alignment) may be stable against thermal fluctuations and may require an applied electric field (not necessarily along the same axis) to disrupt the ordering. For the examples shown in FIG. 5A, thermal excitations are sufficient to disrupt molecular segment ordering. As shown, the curve 517R for segment 517 alignment with the z-axis (also measured with a series of polarized spectra) decays to 1/e of maximal alignment due to thermal excitations with a characteristic period T2.

In FIG. 6A a sample molecule 610 is initially in a random state with short segment 611 and long segment 613 having no preferred direction. As shown in FIG. 6B, at time t0, an orienting electric field with waveform Vz is applied in the z-direction causing segments 611 and 613 or the sample molecule to orient preferentially along the z-axis. Note that in general the orientation depends upon the distribution of charge in the molecular segment and is not necessarily along the direction of the applied electric field. Orientation in the direction of the electric field is for illustrative purposes only. At a time greater than T1 for segments 611 and 613 (orientation above a threshold value) a temporally varying electric field is generated in the x-direction perpendicular to the stationary z-direction field. The frequency of the temporally varying electric field is varied systematically with example waveforms Vx1 and Vx2 illustrating low and high frequency fields, respectively. The response of the short segment 611 to the low frequency field is given schematically in plot Aa1. Due to low mass and moments of inertia, segment 611 oscillates in the x-direction with large amplitude in phase with the applied field Vx1. Due to higher mass and moments of inertia, segment 613 oscillates with a phase delay and reduced amplitude as shown schematically in plot Ab1. Even if the spectral contributions of segments 611 and 613 are at the same wavelength and would be indistinguishable in the static case, the contributions of each segment may be separated on the basis of the phase difference between them with respect to the driving waveform Vx1 with a lock-in amplifier or spectrum analyzer. The amplitude and phase of spectral contributions from each segment change as the driving frequency is changed. For the driving waveform Vx2, the responses of segments 611 and 613 are shown schematically in plots Aa2 and Ab2, respectively. The spectral response for short segment 611 in plot Aa2 is phase shifted and reduced in amplitude compared with plot Aa1 due to the higher excitation frequency. As shown in plot Ab2, long segment 613 is over-driven at the higher frequency excitation Vx2 and consequently has a significant phase shift and reduced amplitude. The spectral contributions of segments 611 and 613 may again be separated with a lock-in amplifier or spectrum analyzer by for example varying the selected phase. The method of FIG. 6B gives multidimensional spectra with dimensions amplitude, wavelength (or frequency equivalent), excitation frequency, excitation amplitude, and response phase. In addition the sample temperature may be varied, which changes the inter-molecular and intra-molecular interactions and hence spectral response.

FIG. 7 shows two examples of three dimensional voltage excitation patterns for the arrangement of FIG. 4A. The first pattern consists of voltage waveforms 701, 702, and 703 generated by voltage sources 436, 432, and 431, respectively. The second pattern consists of voltage waveforms 711, 712, and 713 generated by voltage sources 436, 432, and 431, respectively. The waveform 701 or 711 is applied to electrode 426 to produce an electric field component in the x direction as shown at 401. The waveform 702 or 712 is applied to electrode 422 to produce an electric field component in the y direction. The waveform 703 or 713 is applied to electrode 421 to produce an electric field component in the z direction. The net electric field acting on sample molecules in interaction volume 401 is the vector sum of the x, y, and z components.

As indicated at 704 and 714 it is convenient to apply an initial electric field in one direction of sufficient magnitude and duration to preferentially align sample molecules. In the first example (701, 702, 703) sample molecules are oriented relative to the x-direction. In the second example (711, 712, 713) molecules are oriented relative to an axis in the x+y direction. An initial alignment field may be generated in any desired direction by adjusting the voltage applied to electrodes 421, 422 and 426. Following initial alignment, the electric field may be cycled periodically with frequency f as shown at 705 and spectral features from molecular segments oscillating with frequency f may be extracted using a lock-in amplifier or spectrum analyzer. It should be noted that lock-in detection captures the response with frequency of the excitation plus harmonics of the excitation frequency. The cycle may be bipolar or monopolar. In the monopolar case, sample molecules cycle between a preferred orientation corresponding to θ=90 degrees (see FIG. 2) and relax as best shown at 550 in FIG. 5A to a random orientation. In the bipolar case, sample molecules cycle between preferred orientations at θ=90 degrees and θ=−90 degrees. If the excitation frequency is greater than the natural frequency of the sample molecule or molecular fragment, the amplitude of oscillation will be less than 90 degrees. Spectroscopic measurements may be made at a higher frequency than the excitation frequency to provide spectra for a range of orientations and dynamical information via the Doppler shift over the range of orientations. For example the excitation frequency could be 10 MHz and the spectroscopic measurement frequency could be 500 MHz. The measurements could be made with high precision using the device of the above cited HRMS patent.

As indicated at 701, 702 and 703, voltage may be applied to produce electric field components relative to any coordinate axis by the arrangement of the invention. By judicious choice of excitation sequences, the sample molecule or segments thereof may be oriented relative to any combination of θ and φ consequently providing more information than a scan over θ alone.

As shown at 702 and 703, excitation voltages may be pseudo random sequences. Pseudo random sequences may be used in three ways. Firstly, pseudo random sequences may emulate the effect of random molecular collisions. Further the impulse from a random electric field may be significantly larger than the momentum transfer from a molecular collision at the sample temperature. That is the "temperature" of a selected molecular fragment may be much higher than the temperature of surrounding molecules of a different type. The larger impulse from an electric field may for example enable a molecule or fragment thereof overcome a potential energy barrier between a first configuration and a second configuration. The random electric field may guide a molecule through a sequence of configurations that avoid a potential energy barrier between a first configuration and a second configuration. Secondly, pseudo random sequences of electric fields applied at frequencies sufficiently low for molecular alignment with the applied field enable spectra to be measured of a molecular orientation at random intervals. The sequence of spectra may be correlated with the excitation sequence to isolate the spectrum associated with each molecular orientation. This method overcomes the ambiguity of harmonic frequencies associated with periodic excitation. Thirdly, pseudo random sequences may be used to sample molecular orientations over the 4π solid angle of possible molecular orientations randomly with equal probability given to each solid angle interval.

As shown in voltage waveform 702, the sequence of electric field components may be a pseudo-random sequence with a uniform time interval between random states. In this case the response of the sample molecule or fragment thereof may be modeled as the response of an oscillator to an impulsive force. Spectral measurements are correlated with the pseudo-random sequence at control 140 to isolate spectral response correlated with the pseudo-random electric field excitation. Pseudo-random excitation sequences do not produce harmonic responses like periodic excitation sequences do and are preferred for this reason.

As shown in voltage waveform 703, there may be a first sub-sequence with first time interval as indicated at 706 and a second sub-sequence with second time interval as indicated at 707. Sub sequence 706 may be used to measure the spectral response of a small molecular fragment and sub sequence 707 may be used to measure the spectral response of a larger molecular fragment.

The voltage and corresponding electric field magnitude may vary between sequences as shown at 701 and 711 and within a sequence as best seen at 715 of sequence 712. The voltage amplitude may be selected to such that the interaction between the resultant electric field and a molecular fragment overcomes a potential energy barrier. The voltage may be selected to produce an interaction magnitude greater than the magnitude of thermal fluctuations, thereby distinguishing the spectroscopic signal induced by the electric field from thermal noise. The voltage may be selected within a random range to emulate thermal excitations. For example, orthogonal excitation field components may be generated from I and Q components of QAM code schemes used in digital communications.

In the examples shown in FIG. 7, the direction labels x, y and z are for illustrative purposes only. Any of the features illustrated may be applied in any combination relative to any axis.

Figure 8A:
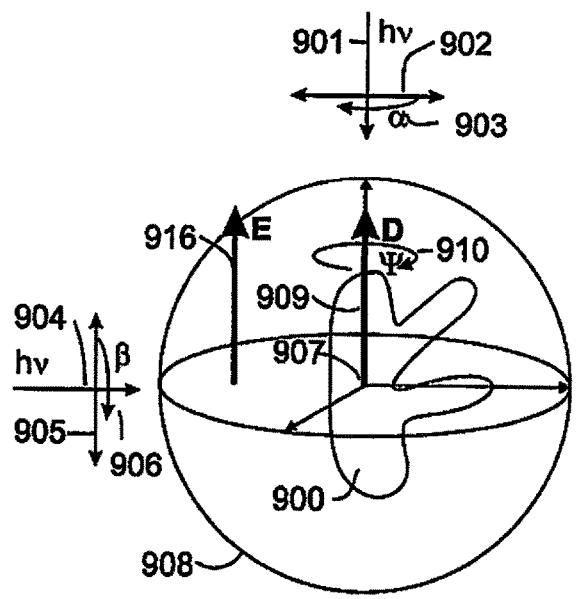
FIGS. 8A and 8B show a molecular fragment within the frame of reference of the measurement system.
Figure 8B:
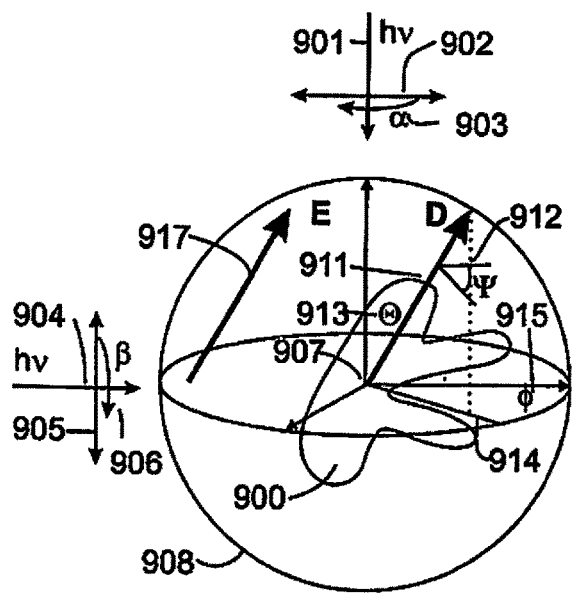

FIGS. 8A and 8B show a molecular fragment 900 within the frame of reference 907 of the measurement means. Probe radiation may be incident on the molecular fragment 900 from different directions as shown at 901 and 904. Probe radiation 901 has orthogonal polarization vector 902 that may be rotated through angle a as shown at 903. Probe radiation 904 has orthogonal polarization vector 905 that may be rotated through angle β as shown at 906. In FIG. 8A molecular fragment 900 has preferred orientation axis D indicated at 909 and may rotate about axis D through angle Ψ as shown at 910. In FIG. 8B molecular fragment 900 has preferred orientation axis D indicated at 911 and may rotate about axis D through angle Ψ as shown at 912. In a system at thermal equilibrium the molecular fragment axis D may point in any direction as indicated by the bounding sphere 908. That is the fragment axis vector may terminate at any point on the bounding sphere 908 surface.

In FIG. 8A the electric field vector is limited to a single axis as shown at 916. Since the molecular orientation axis is fixed by the electric field axis, spectroscopic measurements from all directions described by sphere 908 requires the probe radiation sources to be moved within the frame of reference of the measurement means 907. In practice moving the optical assembly associated with the probe radiation is a slow and cumbersome process. Molecular fragment 900 may rotate freely about fragment axis 909 and every value of Ψ shown at 910 is equally probable. The spectra measured in probe radiation directions 901 and 904 are averages over all values of Ψ. The magnitudes of dipole moments 215 and 216 in FIG. 2A may be measured, but the relative directions of the dipole moments cannot be resolved.

FIG. 8B illustrates advantages of the arrangement shown in FIG. 4A in which the electric field vector 917 can point in any direction. Firstly, the molecular segment axis D shown at 911 may terminate at any point on the surface of sphere 908. The direction of molecular segment axis 911 is conveniently expressed in spherical coordinates θ and ϕ as shown at 913 and 915, respectively. Here ϕ is the angle between the polarization axis 902 and a projection of the molecular segment axis shown at 914. This means that spectra for all angles between probe radiation direction 901 and molecular segment axis may be measured by rotating the molecular fragment axis 911 in the measurement frame of reference 907 with a sequence of electric fields rather than rotating the probe beam apparatus. The molecular segment axis can be rotated to an arbitrary direction very quickly, typically milli-seconds to micro-seconds allowing spectra measurements from a large number of directions to be made. Secondly, the sequence of electric fields can exert torques about molecular axis 911 to direct Ψ to a defined angle as shown at 912. This enables the direction of each transition dipole moment (215 and 216 in FIG. 2A) to be determined. Thirdly, the polarization axis 902 may be fixed because a molecular segment axis rotation through ϕ 915 is equivalent to a rotation of the polarizer angle a at 903. That is spectra for a range of angles between the polarization vector 902 and molecular segment axis 911 may be measured rapidly by rotating the molecular segment axis 911 through angle ϕ at 915.

Figure 8C:
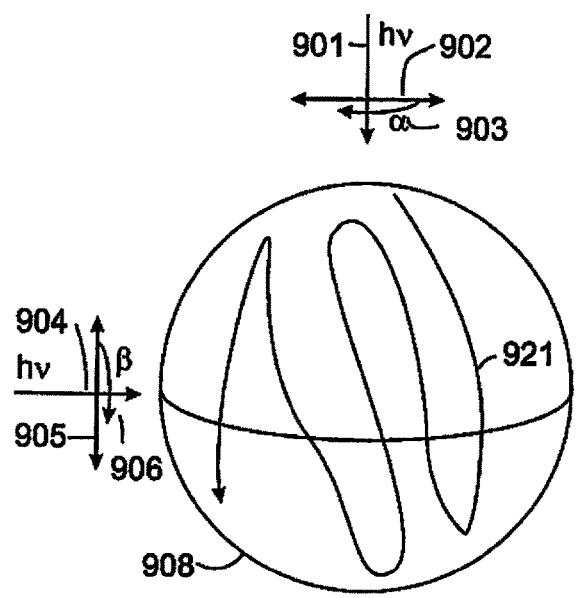
FIGS. 8C and 8D illustrate respectively the effect of applying a sequence of disturbances to a first type of molecule and a second type of molecule that contain the same molecular fragment.
Figure 8D:
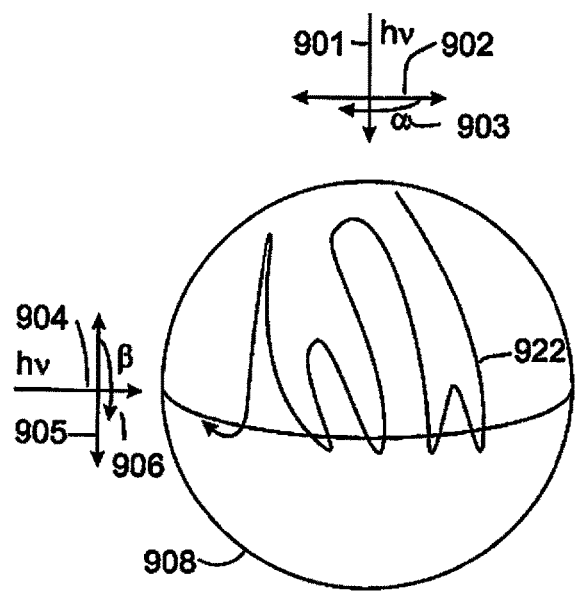

FIGS. 8C and 8D illustrate the effect of applying a sequence of disturbances to a first type of molecule (FIG. 8C) and a second type of molecule (FIG. 8D) that contain the same molecular fragment 900. In the first type of molecule, molecular fragment 900 follows path 921. In the second type of molecule, molecular fragment 900 follows path 922. The paths 921 and 922 differ because the dynamical properties of the first and second molecule types are different. As shown molecular fragment 900 is less constrained and has larger amplitude of motion when attached to the first molecule type (path 921) than when attached to the second molecule type (path 922). A sequence of spectra measured along path 921 differs from a sequence of spectra measured along path 922 enabling a distinction to be made between molecules of the first and second types.

The algorithm controlling operation may be executed by control means 140 in software code, in hardware, or any combination of software and hardware.

The detection process starts by placing sample molecules that may include target molecules in interaction volume 101. Control means 140 retrieves measurement parameters for the target molecule from memory 144 or from an external source 145. The measurement parameters are temporal sequences of device settings together with the required time step for each setting. The polarization of probe radiation is specified, for instance, the angles α and β indicated at 903 and 906 in FIG. 8A, for each measurement time. A temporal sequence of electric field vectors is specified, or equivalently the voltage to be applied to each electrode for each time interval. A temporal sequence of magnetic field vectors is specified, or equivalently the current applied to an electromagnet for each time interval. A temporal sequence of acoustic excitation vectors is specified.

A pseudo code representation of an example measurement algorithm is given. Other algorithms that perform the same types of measurements, for example in a different order may be used. The pseudo code first sets the probe radiation polarization for a set of measurements. At user defined time intervals, the algorithm increments a counter k and sets retrieves the $k^{th}$ electric, magnetic and acoustic fields from a sequence of disturbances and generates signals causing the required fields to be generated. The signals may for example be digital codes directed to a DAC causing a voltage to be generated and transmitted to an electrode. The algorithm next measures m spectra at each detector with time steps between spectra less than or equal to the time step between disturbance changes. For example, the electric, magnetic and acoustic fields may be updated (not necessarily changed) with a frequency of 1 MHz and spectral measurements may be made at a frequency of 100 MHz (100 spectra measured per disturbance state). The multi-dimensional spectra (amplitude and wavelength) so collected are functions of disturbance fields, observation direction and probe radiation polarization.

Optionally raw spectral data may be processed to extract spectral contributions from different molecular segments. The spectral contributions may be extracted using lock-in amplifier techniques or a spectrum analyzer for periodic sample excitation. The spectral contributions may be extracted using a correlator if a pseudo-random sequence of sample excitations. This process has the effect of filtering out noise and enhancing distinct spectral signals.

Optionally, dynamical properties of molecular segments such as T1 T2 and velocity may be extracted by analyzing the temporal dependence of molecular segment spectral features. A curve fitting in process has the effect of filtering out noise and enhancing distinct spectral signals.

A pattern recognition algorithm compares multi-dimensional spectral data from the sample molecules with multi-dimensional spectral data from a target molecule and computes a similarity index. If the similarity index exceeds a threshold value, the sample molecules are classified as target molecules. The multi-dimensional spectra of target molecules may be retrieved from a database. The sample molecules may be compared with a plurality of target molecule types. The similarity index may be calculated with multivariate statistical methods or with artificial intelligence methods that learn patterns in the spectral data, for example with neural networks. The pattern recognition algorithm may operate on raw spectral data, on quantities derived from the raw data or any combination thereof.

Raw spectral data from measurement algorithm and/or data derived from raw spectral data may be analyzed to determine which measurements (and associated disturbances) give the greatest distinction between target molecules of different types. Based on this analysis, the sequence of disturbances may be modified to concentrate measurement time on those measurements with the highest diagnostic value.

The methods described herein may be applied equally well to molecules and to distinct assemblies of molecules. For example, a biological entity such as a virus or bacteria contains many types of separate molecules in roughly constant proportions. Within the scope of this invention, the biological entity is considered to be a single molecule and the constituent molecules are deemed to be molecular fragments.

In summary, ordering on different length scales corresponding to different segment lengths produces a hierarchy of spectra with different time constants. The spectrum of a molecule is the superposition of spectra from each segment wherein the spectrum from each segment is selected from $\theta$, $\phi$ space according to the molecular configuration. The spectrum of a collection of molecules in turn is a superposition of spectra from each molecule. The molecular configuration, and hence the region of $\theta$, $\phi$ space contributing to the spectrum from each molecular segment is selected by a sequence of disturbances which may be acoustic or electromagnetic. In a first embodiment of the invention, a temporal sequence of disturbances produces a temporal sequence of molecular configurations and spectra are measured for two or more molecular configurations in the sequence to give a three dimensional data cube with dimensions wavelength, amplitude and configuration number. In a second embodiment of the invention, further polarization is measured giving a fourth dimension. In another embodiment of the invention that can be used with any other embodiment, spectra are measured in different directions giving and each direction provides a further spectral dimension. In another embodiment of the invention that can be used with any other embodiment, the dimension of frequency response is added. Specifically, the sequence of disturbances includes a frequency sweep wherein a periodic sequence of disturbances is applied at different frequencies and a lock-in amplifier or spectrum analyzer is used to isolate the spectral contribution from each frequency. Specifically, the sequence of disturbances includes a frequency sweep wherein a periodic sequence of disturbances is applied at different frequencies and a lock-in amplifier or spectrum analyzer is used to isolate the spectral contribution from each frequency. The measured multi-dimensional pattern of amplitudes for each molecule type is termed the signature for that molecule type. A molecule type in an unknown mixture may be identified by comparison with a previously measured signature. The number of dimensions and the complexity of the sequence of perturbing fields required to distinguish between molecule types increases as similarity between molecule types increases. In another embodiment of the invention that can be used with any other embodiment, further the temperature of the sample is varied. In another embodiment of the invention that can be used with any other embodiment, further a material is added proximate to a molecular segment thereby changing the dynamical properties of the molecular segment.

The invention claimed is:

1. A method for obtaining information relating to a target molecule in a sample volume containing sample molecules comprising:
   applying a sequence of temporally varying fields in a field direction to the sample volume caused by acoustic forces and/or by electromagnetic fields including electric fields and magnetic fields, or any combination thereof;
   wherein the sequence of temporally varying fields is chosen to produce a temporal sequence of at least two different perturbed molecular configurations for said target molecule in the sample wherein the perturbed molecular configurations are at least in part correlated with the direction and temporal dependence of said applied fields;
   for at least two of said perturbed molecular configurations in said temporal sequence of perturbed molecular configurations directing probe radiation incident on the sample molecules wherein at least some probe radiation with at least one wavelength in the incident probe radiation beam interacts with at least one sample molecule;
   collecting interaction radiation that has at least in part interacted with at least one molecule in each of said at least two perturbed configurations;

measuring a temporal sequence of amplitudes of interaction radiation collected for one or more of directions and/or polarizations which are related to the field direction.

for each field direction and/or polarization, separating amplitudes that are related to the temporal sequence of applied fields from amplitudes that are not related to the temporal sequence of applied fields;

and obtaining information relating to a target molecule from amplitudes that are related to the temporal sequence of applied fields.

2. The method according to claim 1 including identifying from the measured amplitudes a signature indicative of the target molecule by comparison to a reference signature so as to detect presence of the target molecule in the sample volume.

3. The method according to claim 1 wherein said probe radiation incident on the sample molecules is directed as a sequence of probe radiation.

4. The method according to claim 3 wherein further a first temporal sequence of fields causes at least one target molecule to assume a first configuration state related at least in part to the directions of the first temporal sequence of fields; a second temporal sequence of fields causes said at least one target molecule to assume a sequence of configuration states that are perturbed relative to the first configuration state and interaction radiation is measured for at least two configuration states perturbed relative to said first configuration state.

5. The method according to claim 1 wherein time periods associated with the applied fields and with the perturbed molecular configurations are different.

6. The method according to claim 5 wherein, for each applied field, amplitudes of interaction radiation are measured at plurality of different times offset from the time each applied field is applied and wherein the time interval between measurements is less than the time interval between applied fields.

7. The method according to claim 6 wherein, for each applied field, a temporal sequence of probe radiation is applied and interaction radiation is measured for each probe radiation in the sequence of probe radiation.

8. The method according to claim 1 wherein the temporally varying fields are periodic and at least two fields in the sequence have different frequencies.

9. The method according to claim 8 wherein a sequence of target molecule configurations is related to the frequency of the temporally varying field and an amplitude of interaction radiation is measured at a measurement frequency that is at least twice the frequency of the temporally varying field.

10. The method according to claim 1 wherein at least one temporally varying field is aperiodic and the amplitude of interaction radiation is measured at time intervals less than the minimum time interval between changes in the applied field.

11. The method according to claim 1 wherein the configuration of the target molecule changes with time in response to an applied field and the amplitudes of interaction radiation are made at least two different times.

12. The method according to claim 1 wherein the configuration of the target molecule depends at least in part on a dynamical property of the target molecule wherein the dynamical property is a mass or moment of inertia.

13. The method according to claim 1 wherein the configuration of the target molecule depends at least in part on an interaction between the target molecule and another molecule.

14. The method according to claim 1 wherein at least one field in the sequence of temporally varying fields is applied as electromagnetic radiation.

15. The method according to claim 1 wherein at least one field in the sequence of temporally varying fields is applied as an acoustic disturbance.

16. The method according to claim 1 wherein at least one probe radiation in the sequence of probe radiation is electromagnetic radiation.

17. The method according to claim 1 wherein at least one probe radiation in the sequence of probe radiation an acoustic wave.

18. The method according to claim 1 wherein the sequence of temporally varying fields includes at least two applied electric fields which are not collinear.

19. The method according to claim 18 wherein for any first applied electric field state in the sequence directed in a first direction, there is at least one second applied electric field state that is directed in second direction wherein an angle between the first direction and the second direction is not an integer multiple of pi radians.

20. The method according to claim 18 wherein said applied electric fields have different magnitudes.

21. The method according to claim 18 wherein the direction of at least one electric field is selected in relation to a direction of a transition dipole moment in an assembly of the sample molecules.

22. The method according to claim 18 wherein the electric fields include an alignment electric field state applied for a first period that induces a preferred orientation for the target molecules within the sample molecules.

23. The method according to claim 22 wherein the probe radiation includes a direction of a sequence of probe electric field states which is selected in relation to said preferred orientation.

24. The method according to claim 1 wherein the amplitude of the interaction radiation is measured for at least two different polarization states.

25. The method according to claim 1 wherein a first sub-sequence of applied electric fields is applied to the sample molecules to configure said sample molecules in a first configuration and a second sub-sequence of applied electric fields is applied to said sample molecules to produce at least two perturbed second molecular configurations, wherein the probe radiation is incident on each second molecular configuration and the amplitude of interaction radiation is measured.

26. The method according to claim 25 wherein at least part of the sequence of temporally varying fields is periodic with a modulation frequency and wherein the interaction radiation with modulation frequency is amplified to select amplitudes associated with a molecular configuration.

27. The method according to claim 25 wherein the amplitude of the interaction radiation at each wavelength is analyzed in relation to the modulation frequency of a sub-sequence of the applied electric field states.

28. The method according to claim 27 wherein the interaction radiation is analyzed using a lock-in amplifier.

29. The method according to claim 1 wherein at least part of the sequence of temporally varying fields is a pseudo-random sequence and the interaction radiation is correlated with the pseudo-random sequence to select amplitudes associated with a molecular configuration.

30. The method according to claim 29 wherein a time shifted sequence of the interaction radiation is correlated with a sequence of temporarily varying fields to select radiation associated with a molecular configuration.

31. The method according to claim 1 wherein a temporally dependent Doppler shift of the interaction radiation relative to the probe radiation is measured.

32. The method according to claim 1 wherein at least one applied electromagnetic field is a flux of photons that induces a change in the charge distribution of a sample molecule and a magnetic resonance spectrum of the sample molecule is measured.

33. The method according to claim 1 wherein the step of separating amplitudes that are related to the temporal sequence of applied fields from amplitudes that are not related to the temporal sequence of applied fields includes separating at least one amplitude of interaction radiation that is related to an applied field with a phase shift.

34. The method according to claim 1 wherein the probe radiation is produced by a pulsed laser.

35. The method according to claim 1 wherein a sequence of temporally varying fields in the sample volume in at least one field direction is generated by a temporally varying voltage applied between electrodes and wherein at least one electrode for producing said applied fields is shaped to filter or diffract at least one probe radiation.

36. The method according to claim 1 wherein at least one molecular fragment axis is rotated relative to a probe radiation direction with a sequence of electric fields.

* * * * *